(12) United States Patent
Lee et al.

(10) Patent No.: US 11,740,792 B2
(45) Date of Patent: Aug. 29, 2023

(54) TECHNIQUES FOR DATA STORAGE MANAGEMENT

(71) Applicant: Dell Products L.P., Hopkinton, MA (US)

(72) Inventors: Shuyu Lee, Acton, MA (US); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 45 days.

(21) Appl. No.: 17/567,955

(22) Filed: Jan. 4, 2022

(65) Prior Publication Data

US 2023/0214115 A1 Jul. 6, 2023

(51) Int. Cl.
*G06F 3/06* (2006.01)

(52) U.S. Cl.
CPC .......... *G06F 3/0608* (2013.01); *G06F 3/0659* (2013.01); *G06F 3/0688* (2013.01)

(58) Field of Classification Search
CPC ..... G06F 3/0608; G06F 3/0659; G06F 3/0688
See application file for complete search history.

(56) References Cited

U.S. PATENT DOCUMENTS

| | | | | |
|---|---|---|---|---|
| 2011/0099320 A1* | 4/2011 | Lucas | .................. | G06F 3/0616 711/170 |
| 2011/0320733 A1* | 12/2011 | Sanford | .............. | G06F 12/0871 711/135 |
| 2013/0061019 A1* | 3/2013 | Fitzpatrick | .......... | G06F 11/3409 711/173 |
| 2015/0169442 A1* | 6/2015 | Fisher | ................. | G06F 12/0253 711/103 |
| 2022/0413708 A1* | 12/2022 | Canepa | ................. | G06F 3/0611 |

* cited by examiner

*Primary Examiner* — Larry T Mackall
(74) *Attorney, Agent, or Firm* — Muirhead and Saturnelli, LLC

(57) ABSTRACT

A data storage system can use non-volatile solid state drives (SSDs) to provide backend storage. The data storage system and SSDs can implement log structured systems (LSSs) experiencing write amplification (WA). The aggregated WA of the LSSs can be minimized when the WAs of both LSSs of the system and SSDs are equal, within a specified tolerance. An amount of storage capacity which the LSS of the data storage system is allowed to use can be limited and vary based on the system's data capacity denoting the storage capacity with valid data. Pm can denote a percentage of Cs, the advertised capacity of the SSDs, storing valid data. Po can be a percentage of Cs denoting the upper bound of the system's used capacity. Po and Pm, as well as the utilization and WA of both the data storage system and SSDs, can be evaluated and adjusted adaptively and holistically.

20 Claims, 11 Drawing Sheets

| 402 F values | 404 (NS) # Source PLBs needed to generate 1 free PLB | 406 (NT) # target PLBs written to |
|---|---|---|
| 50% (e.g., .50 or 1/2) | 2 | 1 |
| 33% (e.g., .33 or 1/3) | 3 | 2 |
| 25% (e.g., .25 or 1/4) | 4 | 3 |
| 10% (e.g., .10 or 1/10) | 10 | 9 |

FIG. 7

| 502 Cs * Po (e.g. TC SSD) | 504 Cs * (1-Ps) | 506 SSDu | 508 WAs | 510 Pm | 512 Cs * Pm | 514 Cs * Po | 516 DSu | 518 WAm | 520 WAa | |
|---|---|---|---|---|---|---|---|---|---|---|
| SSD used capacity (Fixed/constant= 100% SSD Adv Capacity Cs, where Po=100%) (TB) | SSD Raw/Actual Total Capacity (TB) | SSD Utilization (%) | SSD WA | DS Utilization Wrt SSD adv Capacity Cs (%) | DS data capacity storing valid data (TB) | DS Used capacity (e.g., SSD capacity allocated to/used by DS; (Constant= 100% SSD Adv Cap Cs) (TB) | DS utilization (%) | DS WA | Traditional Aggregated WA | |
| 1.00 | 1.28 | 78.13% | 4.57 | 5.00% | 0.05 | 1.00 | 5.00% | 1.05 | 4.81 | 522a |
| 1.00 | 1.28 | 78.13% | 4.57 | 10.00% | 0.10 | 1.00 | 10.00% | 1.11 | 5.08 | 522b |
| 1.00 | 1.28 | 78.13% | 4.57 | 15.00% | 0.15 | 1.00 | 15.00% | 1.18 | 5.38 | 522c |
| 1.00 | 1.28 | 78.13% | 4.57 | 20.00% | 0.20 | 1.00 | 20.00% | 1.25 | 5.71 | 522d |
| 1.00 | 1.28 | 78.13% | 4.57 | 25.00% | 0.25 | 1.00 | 25.00% | 1.33 | 6.10 | 522e |
| 1.00 | 1.28 | 78.13% | 4.57 | 30.00% | 0.30 | 1.00 | 30.00% | 1.43 | 6.53 | 522f |
| 1.00 | 1.28 | 78.13% | 4.57 | 35.00% | 0.35 | 1.00 | 35.00% | 1.54 | 7.03 | 522g |
| 1.00 | 1.28 | 78.13% | 4.57 | 40.00% | 0.40 | 1.00 | 40.00% | 1.67 | 7.62 | 522h |
| 1.00 | 1.28 | 78.13% | 4.57 | 45.00% | 0.45 | 1.00 | 45.00% | 1.82 | 8.31 | 522i |
| 1.00 | 1.28 | 78.13% | 4.57 | 50.00% | 0.50 | 1.00 | 50.00% | 2.00 | 9.14 | 522j |
| 1.00 | 1.28 | 78.13% | 4.57 | 55.00% | 0.55 | 1.00 | 55.00% | 2.22 | 10.16 | 522k |
| 1.00 | 1.28 | 78.13% | 4.57 | 60.00% | 0.60 | 1.00 | 60.00% | 2.50 | 11.43 | 522l |
| 1.00 | 1.28 | 78.13% | 4.57 | 65.00% | 0.65 | 1.00 | 65.00% | 2.86 | 13.06 | 522m |
| 1.00 | 1.28 | 78.13% | 4.57 | 70.00% | 0.70 | 1.00 | 70.00% | 3.33 | 15.24 | 522n |
| 1.00 | 1.28 | 78.13% | 4.57 | 75.00% | 0.75 | 1.00 | 75.00% | 4.00 | 18.29 | 522o |
| 1.00 | 1.28 | 78.13% | 4.57 | 80.00% | 0.80 | 1.00 | 80.00% | 5.00 | 22.86 | 522p |

FIG. 8A

| | 602 Cs*Po | 604 Cs*(1+Ps) | 606 SSDu | 608 WAs | 610 Pm | 612 Cs*Pm | 614 Cs*Po | 616 DSu | 618 WAm | 620 WAs |
|---|---|---|---|---|---|---|---|---|---|---|
| | SSD used capacity (Po=UB that varies with Pm) (TB) | SSD Raw/Actual Total Capacity (TB) | SSD Utilization (%) | SSD WA | DS Utilization Wrt SSD adv Capacity Cs (%) | DS data capacity storing valid data (TB) | DS Used capacity (e.g., SSD capacity allocated to/ used by DS; (Po=UB that varies with Pm) (TB) | DS utilization (%) | DS WA | Aggregated WA (using present disclosure techniques) |
| 622a | 0.25 | 1.28 | 19.76% | 1.25 | 5.00% | 0.05 | 0.25 | 19.76% | 1.25 | 1.55 |
| 622b | 0.36 | 1.28 | 27.95% | 1.39 | 10.00% | 0.10 | 0.36 | 27.95% | 1.39 | 1.93 |
| 622c | 0.44 | 1.28 | 34.23% | 1.52 | 15.00% | 0.15 | 0.44 | 34.23% | 1.52 | 2.31 |
| 622d | 0.51 | 1.28 | 39.53% | 1.65 | 20.00% | 0.20 | 0.51 | 39.53% | 1.65 | 2.73 |
| 622e | 0.57 | 1.28 | 44.19% | 1.79 | 25.00% | 0.25 | 0.57 | 44.19% | 1.79 | 3.21 |
| 622f | 0.62 | 1.28 | 48.41% | 1.94 | 30.00% | 0.30 | 0.62 | 48.41% | 1.94 | 3.76 |
| 622g | 0.67 | 1.28 | 52.29% | 2.10 | 35.00% | 0.35 | 0.67 | 52.29% | 2.10 | 4.39 |
| 622h | 0.72 | 1.28 | 55.90% | 2.27 | 40.00% | 0.40 | 0.72 | 55.90% | 2.27 | 5.14 |
| 622i | 0.76 | 1.28 | 59.29% | 2.46 | 45.00% | 0.45 | 0.76 | 59.29% | 2.46 | 6.03 |
| 622j | 0.80 | 1.28 | 62.50% | 2.67 | 50.00% | 0.50 | 0.80 | 62.50% | 2.67 | 7.11 |
| 622k | 0.84 | 1.28 | 65.55% | 2.90 | 55.00% | 0.55 | 0.84 | 65.55% | 2.90 | 8.43 |
| 622l | 0.88 | 1.28 | 68.47% | 3.17 | 60.00% | 0.60 | 0.88 | 68.47% | 3.17 | 10.06 |
| 622m | 0.91 | 1.28 | 71.26% | 3.48 | 65.00% | 0.65 | 0.91 | 71.26% | 3.48 | 12.11 |
| 622n | 0.95 | 1.28 | 73.95% | 3.84 | 70.00% | 0.70 | 0.95 | 73.95% | 3.84 | 14.74 |
| 622o | 0.98 | 1.28 | 76.55% | 4.26 | 75.00% | 0.75 | 0.98 | 76.55% | 4.26 | 18.18 |
| 622p | 1.01 | 1.28 | 79.06% | 4.77 | 80.00% | 0.80 | 1.01 | 79.06% | 4.77 | 22.80 |

FIG. 8B

TECHNIQUES FOR DATA STORAGE MANAGEMENT

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: receiving a current value for Ps that denotes an amount of overprovisioning of one or more solid state storage devices (SSDs) as a percentage of Cs that denotes an advertised storage capacity of the one or more SSDs in a data storage system; receiving a first value for Pm denoting data storage system utilization as a percentage of Cs, wherein the first value for Pm indicates a percentage of the advertised storage capacity, Cs, storing valid data at a first point in time; determining a second value for Po denoting a percentage of the advertised storage capacity, Cs, allowed to be used by the data storage system, wherein a mathematical product of the second value for Po and Cs denotes an upper bound or maximum storage capacity that the data storage system is allowed to use at the first point in time, wherein said determining the second value for Po includes calculating the second value as a square root of a first quantity, wherein the first quantity is a mathematical product of a first term, 1+Ps, and the first value for Pm; receiving write I/O operations at the data storage system; and processing the write I/O operations using a log structured system (LSS) of the data storage system, wherein the upper bound or the maximum storage capacity denoted by the mathematical product of the second value for Po and Cs is the maximum amount of storage capacity of the one or more SSDs that the LSS can use while performing said processing of the write I/O operations.

In at least one embodiment, processing can further include: detecting an occurrence of a trigger condition at a second point in time while the upper bound or the maximum storage capacity denoted by the mathematical product of the second value for Po and Cs is effective as the maximum amount of storage capacity of the one or more SSDs that the LSS can use while performing said processing of the write I/O operations; receiving a revised value for Pm at the second point in time; responsive to detecting the occurrence of the trigger condition, performing first processing that determines, for the second point in time, a revised value for Po denoting a percentage of the advertised storage capacity, Cs, allowed to be used by the data storage system, wherein a mathematical product of the revised value for Po and Cs denotes a revised upper bound or a revised maximum storage capacity that the data storage system is allowed to use at the second point in time, wherein determining the revised value for Po includes calculating the revised value for Po as a square root of a second quantity, wherein the second quantity is a mathematical product of the first term, 1+Ps, and the revised value for Pm at the second point in time; and responsive to performing the first processing, enforcing the mathematical product of the revised value for Po and Cs as the revised upper bound or the revised maximum storage capacity that the data storage system is allowed to use wherein the LSS of data storage system is not allowed to use more than the revised upper bound or the revised maximum storage capacity of the one or more SSDs.

In at least one embodiment, the trigger condition that has occurred can indicate that Pm has increased between the first point in time and the second point in time by at least a threshold amount. At least a portion of the write I/O operations can be initial writes to logical addresses of one or more thin logical devices that implement virtual provisioning where first backend physical storage is allocated from at least a first of the one or more SSDs in connection with servicing the portion of the write I/O operations that perform initial writes to the logical addresses of the one or more thin logical devices. Allocating the first backend physical storage responsive to processing the portion of the write I/O operations result in increasing Pm between the first point in time and the second point in time.

In at least one embodiment, the trigger condition that has occurred can indicate that Pm has decreased by at least a threshold amount. Pm may have decreased by at least the threshold amount in response to processing one or more operations on the data storage system, wherein the one or more operations can include deleting one or more storage objects. The one or more storage objects can include any one or more of: a logical device, a file, and a file system.

In at least one embodiment, processing can include: determining an absolute value of a difference between the revised value for Pm at the second point in time and the second value for Po currently in effect at the second point in time; and wherein the trigger condition that has occurred can indicate that the absolute value of the difference between the second value for Po and the revised value for Pm at the second point in time is greater than a specified threshold.

In at least one embodiment, processing can include: determining an absolute value of a difference between the revised value for Pm at the second point in time and the second value for Po currently in effect at the second point in time; and wherein the trigger condition that has occurred can indicate that the absolute value of the difference between the second value for Po and the revised value for Pm at the second point in time is less than a specified threshold.

In at least one embodiment, processing can include: determining a first utilization as a ratio of the revised value for Pm at the second point in time with respect to the second value for Po currently in effect at the second point in time; determining a second utilization as a ratio of the revised value for Pm at the second point in time with respect to the revised value for Po; and determining an absolute value of a difference between first utilization and the second utilization. The trigger condition that has occurred can indicate that the absolute value of the difference is greater than a specified threshold.

In at least one embodiment, processing can include: determining a first utilization as a ratio of the first value for Pm at the first point in time with respect to the second value for Po currently in effect at the second point in time; determining a second utilization as a ratio of the revised value for Pm at the second point in time with respect to the second value for Po currently in effect at the second point in time; and determining an absolute value of a difference between first utilization and the second utilization. The trigger condition that has occurred can indicate that the absolute value of the difference is greater than a specified threshold.

In at least one embodiment, the one or more SSDs can be flash-based storage devices. The one or more SSDs can each implement an LSS in connection with management of storage capacity of said each SSD.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 7 is a table of values that can be used to determine write amplification in an embodiment in accordance with the techniques of the present disclosure.

FIG. 8A is a table of information generated for a traditional data storage system that does not operate in accordance with the techniques of the present disclosure.

FIG. 8B is a table of information generated for data storage system that operates in accordance with the techniques of the present disclosure.

DETAILED DESCRIPTION OF EMBODIMENT(S)

Figure 1:
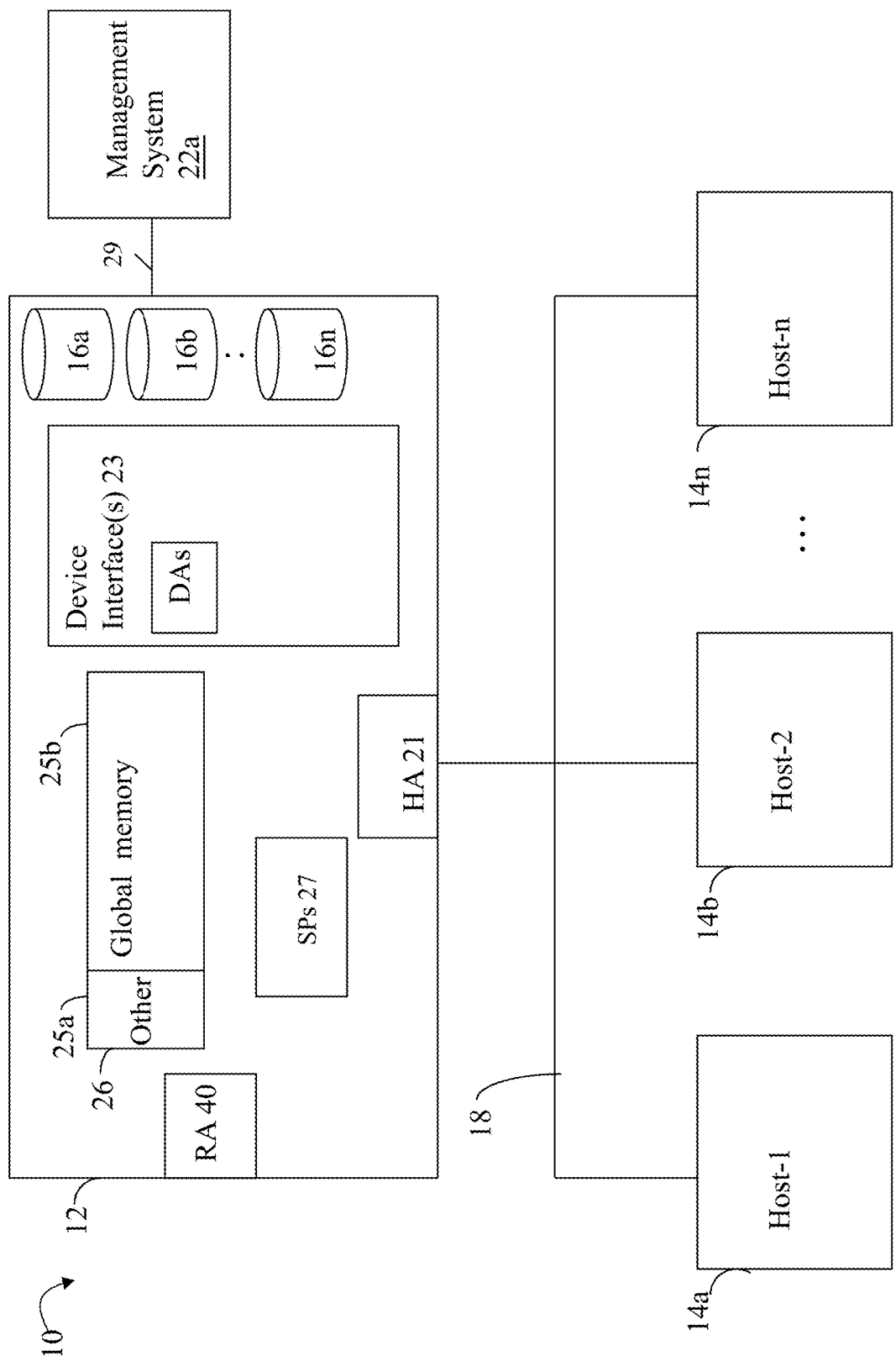
FIG. 1 is an example of components included in a system in accordance with the techniques of the present disclosure.

Generally, log structured stores or systems (LSSs) can be characterized by allowing new writes to be directed to free or unused space on a data storage device, and by performing garbage collection that allows holes of storage including unused or invalid data to be compacted and reused. In an LSS, newly written data can be appended to one end of a circular logical log structure in a sequential manner. As newly written data provides updated values for existing data stored at a logical address, the storage containing the existing data can be invalidated and freed for reuse.

Modern data storage systems can implement an LSS as discussed herein. Additionally, such modern data storage system can also utilize backend non-volatile storage which includes one or more solid state storage devices or SSDs such as flash-based storage devices. The SSDs, such as flash memory storage devices, can employ another LSS since the SSDs do not support in-place data updates. The LSS employed by an SSD can perform a device-level layer of mapping from logical to physical addresses.

Thus, a system can utilize two layers or levels of logs and LSSs including an upper level LSS employed by the data storage system and a lower level LSS employed at the SSD device level. Each layer of logs or each LSS can have its components, for example, to maintain its own log, perform its own logical to physical address translation using its own metadata, to perform garbage collection, to perform storage management controlling data placement, to perform metadata management, and the like.

Both the LSS of the data storage system and the LSS at the SSD level each encounter write amplification (WA) which can generally be characterized as additional writes performed in order to write or store a single unit of valid data. The WA can occur generally due to the nature of operation of the LSS discussed in more detail herein.

In existing traditional data storage systems, the data storage system is allowed to consume or use the entire advertised capacity of the SSDs. As a result, the LSS of the data storage system can have an associated utilization and WA that are minimized. However, such traditional systems do not consider the impact of the foregoing on the WA of the LSS of the SSD. Such traditional systems do not consider the aggregated WA of both the LSS of the data storage system and the LSS of the SSD.

In accordance with the techniques of the present disclosure and in contrast to existing traditional systems, the techniques of the present disclosure consider the aggregated WA of both the LSS of the data storage system and the LSS of the SSD, where the techniques of the present disclosure seek to minimize the aggregated WA of both the data storage system and the SSDs. In at least one embodiment, the utilizations and the WAs of both the data storage system and the SSDs can be evaluated and adjusted holistically in an adaptive and continuous manner to minimize the aggregated WA.

In at least one embodiment in contrast to existing traditional systems, the LSS of the data storage system is not allowed to always consume the entire SSD advertised capacity. In embodiment in accordance with the techniques of the present disclosure, the data storage system's used capacity may not always be equal to the entire advertised SSD storage capacity of the backend storage devices. Rather, the percentage or amount of the SSD advertised capacity which the data storage system is allowed to use can vary depending on the data storage system's utilization denoting a percentage of the SSD storage capacity containing valid data. The techniques of the present disclosure can adjust or vary the data storage system's used capacity in accordance with the data storage system's data capacity. The data storage system's used capacity can denote the maximum or upper bound regarding the amount of the SSD advertised capacity that the LSS of the data storage system is allowed to use. The data storage system's data capacity can denote the current amount of valid data stored on the SSD by the LSS of the data storage system. Thus, the techniques of the present disclosure can collectively evaluate and adapt the utilizations and WAs of both the data storage system and the SSDs providing backend non-volatile storage such that both WAs are equal, or about the same within some specified tolerance or limit. As a result, the aggregate WA can be minimized.

Reducing the aggregated WA can result in tangible advantages and benefits. For example, reducing the aggregated WA reduces the background or extra I/Os performed when writing or storing new data, thereby improving the I/O performance of the data storage system. As another example, reducing the aggregated WA and thereby reducing the background or extra I/Os performed when writing new data generally reduces the SSDs' wear level. As a result, the techniques of the present disclosure minimizing the aggregate WA can prolong the lifetime of the SSDs and improve warranty. For storage vendors, the resulting I/O performance improvement, reduction in wear of the SSDs, and extended SSD lifetime can be characterized as tangible benefits desired by data storage system vendors and customers alike.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22*a* to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22*a* to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
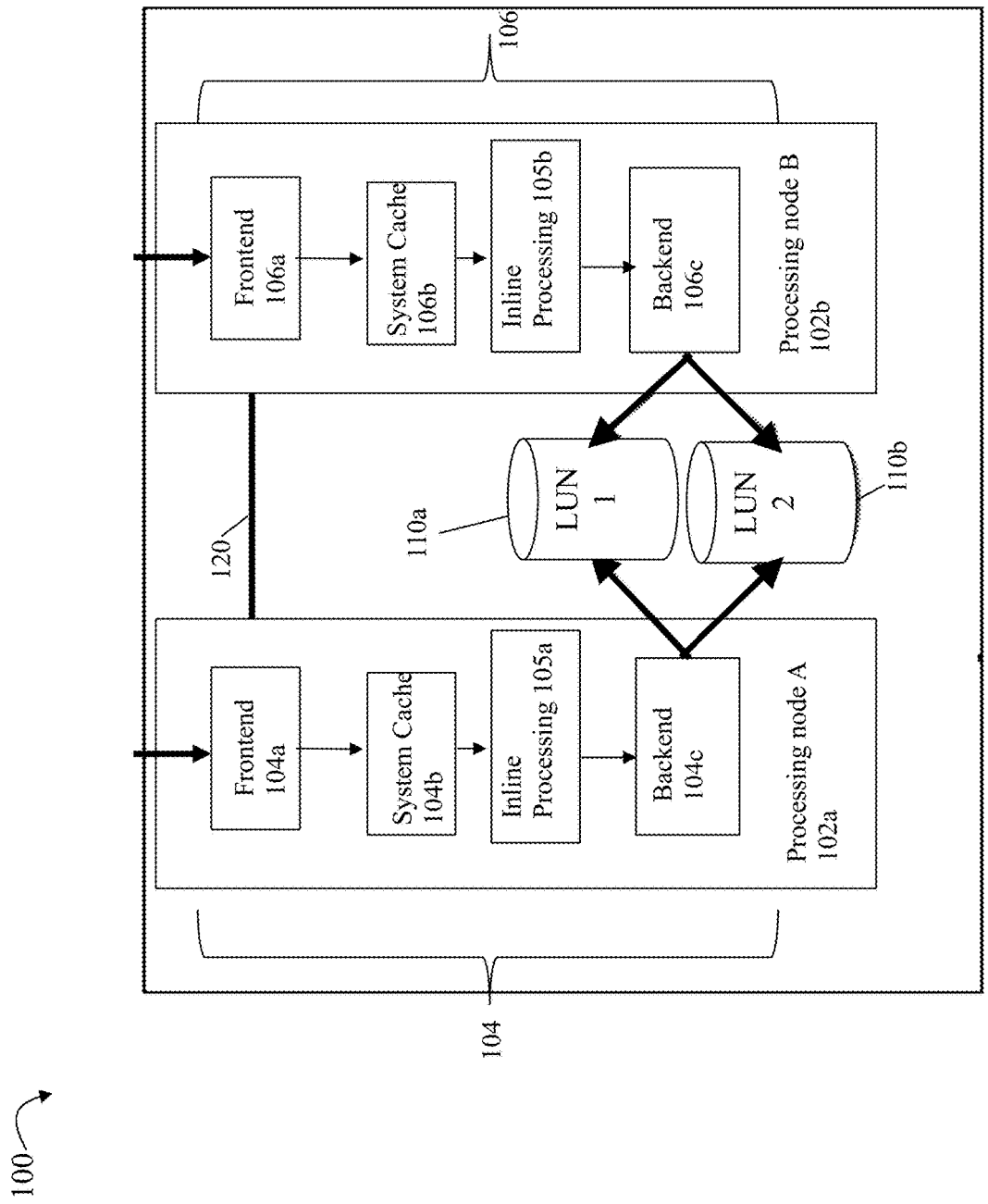
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102*a* and B 102*b* and the associated software stacks 104, 106 of the data path, where I/O requests can be received by either processing node 102*a* or 102*b*. In the example 200, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes directed to the LUNs 110*a*, 110*b* can be received for processing by either of the nodes 102*a* and 102*b*, the example 100 illustrates what is also referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
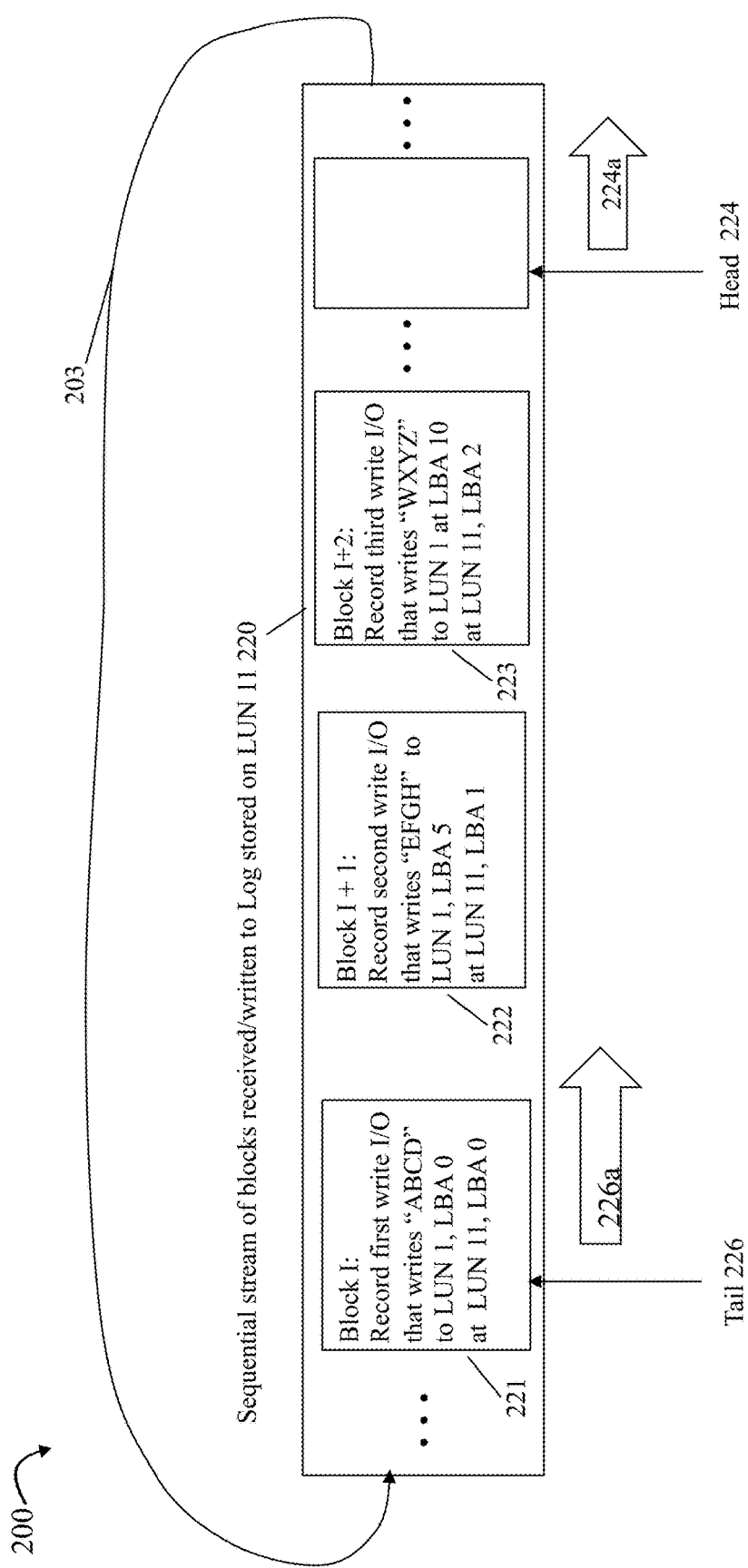
FIGS. 3, 4, 5 and 6 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
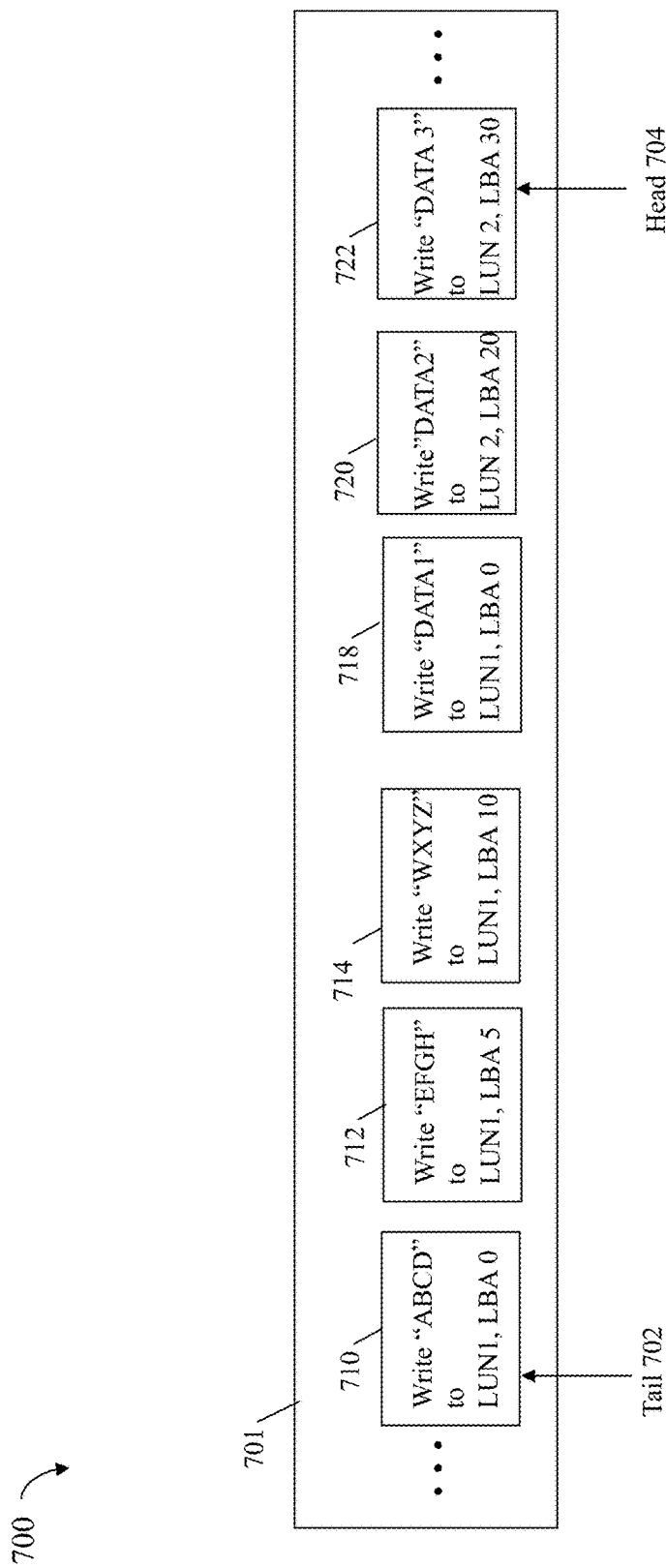

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations.

It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
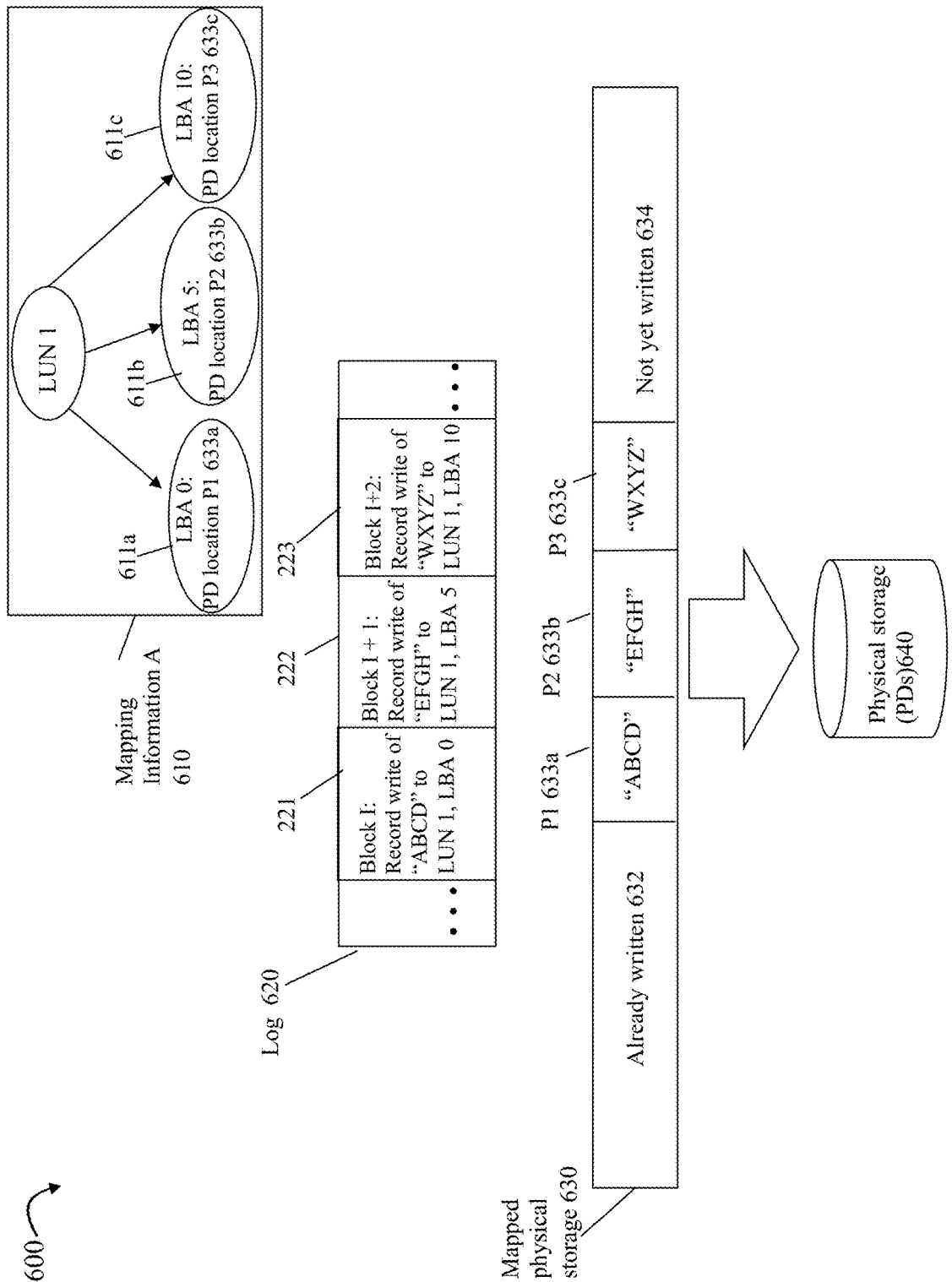

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs.

Figure 6:
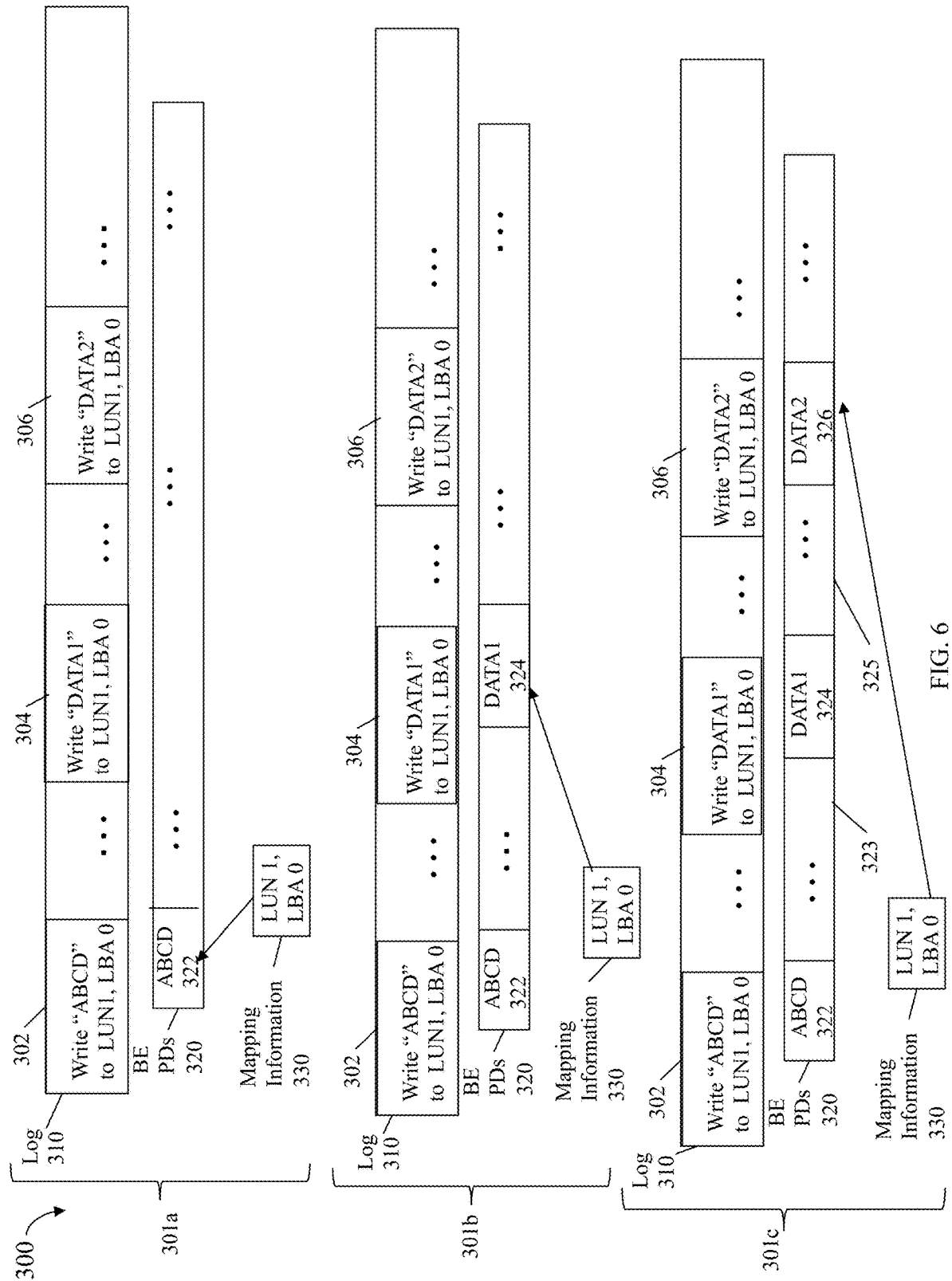

For example with reference to FIG. 6, the element 301a can denote the state of the log file 310, BE PDs 320 and mapping information 330 at a first point in time T1 after processing the record 302 for a first write of "ABCD" to the logical address LUN A, LBA 0. The data written "ABCD" by the recorded write of 302 can be stored at the BE PD location 322. Thus, flushing the log record 302 results in storing the write data "ABCD" to the BE PD location 322 and additionally updating the mapping information 330 to reference the BE PD location 322. The mapping information 330 denotes the metadata used to map the logical address LUN 1, LBA 0 to the current physical location on the BE PDs containing the user data or content stored at the logical address LUN 1, LBA 0. After the log record 302 is flushed from the log 310, the record 302 is available and can be subsequently reclaimed for reuse for logging other operations in the log 310.

At a second point in time T2 subsequent to T1, the log record 304 can be processed and flushed to the BE PDs 320. The element 301b denotes the state of the log file 310, BE PDs 320 and mapping information 330 at the second point in time T2 after processing the record 304 for a second write of "DATA1" to the logical address LUN A, LBA 0. The data written "DATA1" by the recorded write of 304 can be stored at the BE PD location 324. Thus, flushing the log record 304 results in storing the write data "DATA1" to the BE PD location 324 and additionally updating the mapping information 330 to reference the BE PD location 324 denoting the physical location containing the data stored at the LUN 1, LBA 0 at the time T2. Additionally, the PD location 322 can be invalidated since it no longer contains valid current data for the logical address LUN 1, LBA 0, whereby the PD location 322 can be available for reuse. After the log record 304 is flushed from the log 310, the record 304 is available and can be subsequently reclaimed for reuse for logging other operations in the log 310.

At a third point in time T3 subsequent to T2, the log record 306 can be processed and flushed to the BE PDs 320. The element 301c denotes the state of the log file 310, BE PDs 320 and mapping information 330 at the third point in time T3 after processing the record 306 for a third write of "DATA2" to the logical address LUN A, LBA 0. The data written "DATA2" by the recorded write of 306 can be stored at the BE PD location 326. Thus, flushing the log record 306 results in storing the write data "DATA2" to the BE PD location 326 and additionally updating the mapping information 330 to reference the BE PD location 326 denoting the physical location containing the data stored at the LUN 1, LBA 0 at the time T3. Additionally, the PD location 324 can be invalidated since it no longer contains valid current data for the logical address LUN 1, LBA 0, whereby the PD location 324 can be available for reuse. After the log record 306 is flushed from the log 310, the record 306 is available and can be subsequently reclaimed for reuse for logging other operations in the log 310.

As illustrated by the elements 301a-c, over time, the physical storage locations 322, 324 of the BE PDs 320 become free and available for reuse. The other physical storage locations 323, 325 and 326 can still contain valid data. Thus, the free, available reusable physical storage locations 322, 324 can form holes or segments interspersed among the other portions 323, 325, 326 containing valid data. More generally, the size of the holes 322, 324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

In data storage systems implementing a LSS such as described above, garbage collection can be performed by the data storage system at various times in an embodiment. Garbage collection processing can be performed by the data storage system on the BE PDs to aggregate allocated stored data blocks with valid data to eliminate free unused physical storage locations that can be interspersed between the data blocks containing valid data. Such aggregation can include physically copying or moving data blocks of valid user data stored at various physical locations on BE non-volatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation. After the valid data blocks, such as 323, 325 and 326 at the time T3, are relocated from their source locations, the storage locations 322, 323, 324, 325 and 326 denote a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

A specified size or chunk of physical storage of the BE PDs can be referred to as a physical large block or PLB. In at least one embodiment, garbage collection can be performed on physical storage units that are PLBs. In at least one embodiment, each PLB can be 2 MiBs (mebibytes) in size. Within a single PLB, the valid data and the holes (e.g., containing invalid data or designated as an unused portion) can be interspersed since, for example, write granularity size units can be 4K chunks or blocks.

Utilization, such as of a single PLB, can be expressed as a percentage or ratio of allocated consumed storage that contains valid data with respect to the total storage capacity of the PLB. For example, if 25% of the PLB is allocated and includes valid data and the remaining 75% of the PLB is unused and free (e.g., contains invalid data or holes of unused storage), the utilization for the single PLB is 25%. Generally, the lower the per PLB utilization, the more efficient the garbage collection since larger amounts of free capacity are reclaimed and aggregated from PLBs with lower utilization. For example, consider 2 source PLBs that contain a mixture of 50% valid data and 50% invalid data or holes (e.g., each PLB has a 50% utilization with the remaining 50% of the PLB containing invalid or free holes of storage). Garbage collection can be performed to consolidate the valid data in the 2 source PLBs into a single target PLB by copying the valid data from the 2 source PLBs to the target PLB. The foregoing consolidation results in a net gain of 1 free PLB by freeing the 2 source PLBs, and consuming or using the single target PLB that contains the consolidated valid data from the 2 original source PLBs. As another example, consider 4 source PLBs each having a 25% utilization (e.g., each PLB contains 25% valid data with the remaining 75% of the PLB containing invalid or free holes of storage). In this case, garbage collection can be performed to consolidate the valid data of the 4 source PLBs into a single target PLB by copying the valid data from the 4 source PLBs to the target PLB. The foregoing consolidation results in a net gain of 3 free PLBs by freeing the 4 source PLBs, and consuming or using the single target PLB that contains the consolidated valid data from the 4 original source PLBs.

In a data storage system implementing a LSS, garbage collection can be performed by the data storage system in a continuous manner to manage its BE PDs and reclaim physical storage of holes including unused storage or storage with invalid data. The garbage collection results in performing additional overhead operations such as additional read and write operations in connection with reading valid data from the source PLBs and writing the valid data of the source PLBs to a target PLB. The total writes performed by the data storage system in connection with writing new valid data (e.g., such as data written by a host) to a single unit of storage includes the overhead or additional writes performed by the data storage system in connection with garbage collection and management of the system's BE PDs in order to free the single unit of storage, such as the single PLB, given that the source PLBs from which the valid data is read have a certain PLB utilization. The foregoing total number of writes can denote the write amplification, WA, discussed in more detail below, where the WA can be expressed as a function of the PLB utilization, U, of the source PLBs, and also as a function of F, denoting a percentage of free or unused capacity F of the source PLBs. In one aspect, F can be characterized and expressed as U's complement.

Generally, the utilization, U, can be expressed as a percentage as noted above with respect to a total capacity, T, denoting 100% or 1. Thus, the total capacity T can denote 1.0 or 100% can be expressed using the utilization U and its complement, the free or unused storage capacity, F, as in EQUATION 1:

$$F+U=1 \qquad \text{EQUATION 1}$$

Also, the EQUATION 1A follows from EQUATION 1, $$F=1-U \qquad \text{EQUATION 1A}$$

Consistent with the above discussion, new valid data can be written to a free PLB. In order to obtain the free PLB in an LSS, the data storage system performs additional or extra writes as part of its garbage collection to manage the BE PDs. The additional writes are thus generated internally by the data storage system's garbage collection performed for BE PD management.

To further illustrate write amplification WA with respect to garbage collection performed by the data storage system in connection with managing the storage if its BE PDs such as in a LSS, consider values for F of the source PLBs rather than values for U of the source PLBs with reference to FIG. 7.

Referring to FIG. 7, shown is a table 400 of various values and scenarios in connection with generating 1 net free PLB as part of garbage collection processing in a LSS in an embodiment in accordance with the present disclosure. The table 400 includes the column 402 of various values for F denoting different percentages of free or unused PLB storage; the column 404 denoting the number of source PLBs needed to generate 1 net free PLB that can be used to store new data (e.g., newly written host or other client data); and the column 406 denoting the number of target PLBs needed to generate 1 net free PLB that can be used to store new data (e.g., newly written host or other client data). Each row 408-414 of values denotes a number of source PLBs (404) and target PLBs (406) needed to generate 1 net free PLB, where each of the source PLBs has a specified value for F (404) denoting a percentage of free or unused storage of each source PLB. For a given row of the table 400, the column 404 denotes the number of source PLBs from which valid data is read and then written to one of the number of target PLBs (denoted by column 406) to consolidate the valid data of the source PLBs into the target PLBs.

The row 408 indicates that 2 source PLBs (column 404) that each contain 50% (column 402) of free or unused storage capacity can have all their valid data copied to a single target PLB (column 406). The row 410 indicates that 3 source PLBs (column 404) that each contain 33% (column 402) of free or unused storage capacity can have all their valid data copied to two PLBs (column 406). The row 412 indicates that 4 source PLBs (column 404) that each contain 25% (column 402) of free or unused storage capacity can have all their valid data copied to three PLBs (column 406). The row 414 indicates that 10 source PLBs (column 404) that each contain 10% (column 402) of free or unused storage capacity can have all their valid data copied to nine PLBs (column 406). Write amplification can be calculated as a ratio of the data written to the flash memory or SSD with respect to the data written by the host or client, where the "data written to the flash memory or SSD" can be the total number of writes noted above which are performed to store new data to a single PLB, where the total number of writes varies with the F and U of the source PLBs.

Based on the table 400 of FIG. 7, it can be determined that the number of source PLBs, NS (404) for a given F (402), where F=1−U, can be generally expressed as:

$$NS=1/(1-U) \qquad \text{EQUATION 2A}$$

Based on the table 400 of FIG. 7, it can be determined that the number of target PLBs, NT (406) for a given F (402), where F=1-U, can be generally expressed as:

$$NT=(1/(1-U))-1 \qquad \text{EQUATION 2B}$$

It should be noted that NT as determined using EQUATION 2B also denotes the number of PLBs written to as a result of performing garbage collection in order to obtain the net free single PLB. Thus NT denotes the number of additional or extra writes generated as a result of the internal data storage system garbage collection processing to obtain the net free single PLB. Now, an additional write (e.g., +1) is needed to write the new data to the freed single PLB. Thus, the WA denoting the total number of writes performed to store the new data in the freed single PLB can be generally expressed as NT+1 and further represented as:

$$WA=NT+1 \qquad \text{EQUATION 2C}$$

and based on EQUATION 2B, WA can be further expressed below as:

$$WA=(1/(1-U))-1+1=1/(1-U) \qquad \text{EQUATION 2D}$$

WA as expressed above, such as in EQUATION 2D, can denote the write amplification WA as a function of the utilization percentage U, where U can generally represent storage utilization as a percentage or ratio denoting the amount of valid data with respect to a specified total amount of storage. From EQUATION 2D, it can be observed that as the utilization U increases, the corresponding F decreases and the WA increases.

Storage utilization, U, sometimes simply referred to herein as utilization, can be determined at various levels of granularity depending on the particular total storage capacity used. For example, utilization can be determined for an individual PLB as noted above. Utilization can also be determined at the data storage system level and can denote the average system level of storage utilization with respect to the storage capacity of the BE PDs of the data storage system. To illustrate, the total storage capacity of the BE PDs of the data storage system can be, for example 1 terabyte (TB), which is considered 100%, and where the utilization percentage U for the data storage system can denote the percentage of the total storage capacity of the BE PDs containing valid data, and where the free percentage F can denote the percentage of the total storage capacity containing free or available storage (e.g., containing holes of invalid data or unused storage) of the BE PDs. In a similar manner, the WA as expressed using EQUATION 2D can generally be used to denote multiple different write amplifications of different LSSs in accordance with the techniques of the present disclosure discussed in more detail below. For example, the WA of EQUATION 2D can be used to further more specifically define $WA_m$ denoting the WA of the data storage system or storage appliance implementing an LSS, and to further more specifically define WAs denoting the WA of the SSDs with respect to the internal LSS and internal garbage collection performed by the BE PDs which are non-volatile SSDs such as, for example, flash-based storage devices. In at least one embodiment, the data storage system or appliance can implement an LSS as discussed herein. Additionally, as discussed in more detail below, the internal storage management of the non-volatile SSDs (e.g., BE PDs) providing the backend storage can also implement an LSS, where the LSS of the SSD internally also performs garbage collection of its physical storage in a manner similar to that as described above for the LSS of the data storage system. Thus in such an embodiment, garbage collection of the internal LSSs of the SSDs can also incur write amplification WAs in a manner similar to the write amplification $WA_m$ incurred in connection with garbage collection of the LSS implemented by the data storage system or appliance.

In at least one embodiment, $WA_m$ denoting the WA of the data storage system or storage appliance, represents the WA with respect to the additional writes incurred as a result of garbage collection and management of the BE PDs performed by code executing on the data storage system. Thus, $WA_m$ denotes the total writes performed by the data storage system in connection with writing new valid data (e.g., such as data written by a host) to a single unit of storage, such as a PLB, and includes the overhead or additional writes performed by the data storage system in connection with the LSS's garbage collection and management of the system's BE PDs in order to free the single unit of storage, such as the single PLB, given that the source PLBs from which the valid data is read have a certain utilization U or a certain F denoting a percentage of free or unused capacity F of the source PLBs.

As noted above, a non-volatile SSD, such as flash-based storage, can implement an internal LSS with respect to its physical storage. Internal garbage collection can be performed within the SSDs. Due to the nature of flash memory's operation, data cannot be directly overwritten as it can in a rotating disk drive such as a non-SSD hard disk drive. In at least one embodiment implementing flash-based SSDs, when data is first written to an SSD, the cells all start in an erased state so data can be written directly using pages at a time (often 4-8 kilobytes (KB) in size). In at least one embodiment, the SSD controller on the SSD, which manages the flash memory and interfaces with the data storage system, can use an SSD-internal logical to physical mapping system or layer similar to the mapping information, such as the mapping information of FIGS. 5 and 6. The data stored on the SSD can be assigned an SSD-based logical address that is mapped by the SSD's internal mapping information, or more generally metadata, to a corresponding physical storage location on the SSD. When new data comes in replacing older data already written, the SSD controller can write the new data in a new physical location and update the SSD's internal logical mapping information to point to the new physical location. The data in the old location is no longer valid, and will need to be erased before the old location can be written again.

With flash memory, data can be read or written (e.g., programmed) in writeable pages in a random access manner where the writeable page size can be a first size, such as 4

KB. However, flash memory can generally be erased in erasable blocks of typically a much larger second size, such as 256 KB. Thus each erasable block in this example can include 64 writeable or programmable 4 KB pages. When writing a writeable 4 KB page P1, for example, to a 256 KB block B1 and B1 has at least some valid data, the valid data is moved to another physical storage location before writing P1 to B1. In this manner, writing the single 4 KB page P1 to B1 can include performing the following sequence of steps: 1) moving or copying the valid data from B1 to another physical storage location; 2) erasing B1; and 3) writing the new data P1 to B1. In an SSD such as a flash drive, the process of garbage collection includes the additional overhead of reading and rewriting data to the flash memory as just discussed. Thus, a new write from the host to write a new data page P1 can include a read of the block B1, a write of the pages of the block B1 which still include valid data to target block B2 (already erased), erasing B1, and then a write of the new data page P1 to B1. As needed, the SSD's internal mapping information can be updated. The foregoing additional overhead of garbage collection performed internally by the SSD when writing a new page P1 of data is similar to that as described above when the data storage system writes new data to a single PLB of the BE PDs.

Flash memory can be programmed and erased only a limited number of times. This is often referred to as the maximum number of program/erase cycles (P/E cycles) it can sustain over the life of the flash memory.

Overprovisioning (sometimes referred to as OP) can be defined as the difference between the total actual raw physical capacity of the flash memory and the logical advertised capacity presented as available for the user. Overprovisioning with respect to an SSD, such as a flash drive included in the BE PDs of the system, can be referred to herein as Ps. During the garbage collection, wear-leveling, and bad block mapping operations as can be performed for internal storage management on the SSD, the additional space from overprovisioning helps lower the write amplification when the drive controller writes to the flash memory. Overprovisioning of the SSD, Ps, can represented as a percentage ratio of extra capacity with respect to the advertised or user-available capacity as follows:

$$Ps=(TC-Cs)/Cs \qquad \text{EQUATION 3}$$

where

Cs is the logical advertised user capacity, TC denotes the total physical capacity of the SSD including the overprovisioned storage, and Ps denotes a percentage of Cs, the SSD advertised capacity. Cs and TC can also be represented in EQUATION 3 using percentages with respect Cs. For example, an SSD can have an advertised user capacity Cs of 1 TB and a Ps=28%, where 1 TB denotes 100% of the advertised user capacity and where 28%=(0.28*1 TB) denotes Ps, the amount of extra storage reserved for overprovisioning uses internally within the SSD. Thus, TC can be represented as a percentage in EQUATION 3, where TC in the foregoing example is 128% denoting the sum of Cs and Ps, and where Cs and Ps are expressed as percentages with respect to the advertised capacity Cs. In connection with a data storage system in at least one embodiment in accordance with the techniques of the present disclosure, Cs can denote the entire advertised capacity as an aggregate of all the SSDs used as BE PDs of the system.

Typically in existing data storage systems using an LSS, the entire advertised capacity Cs of the BE PDs can be available for use so that the utilization U for the system can be represented as a percentage of the advertised capacity Cs. Let Pm denote the utilization U for the data storage system expressed as a percentage of the SSD advertised capacity Cs:

$$Pm=A1/Cs \qquad \text{EQUATION 4}$$

where

A1 denotes the amount of capacity of the BE PDs or SSDs containing valid data. Put another way, Pm*Cs denotes the data storage system's data capacity which is the current amount of storage capacity containing valid data.

From the perspective of the BE PDs that are SSDs, all of the SSD advertised user capacity Cs can be available for use by the data storage system in existing traditional systems. The total raw capacity, TC SSD, of the BE SSDs includes both the advertised capacity Cs as well as the overprovisioned storage denoted by Ps such that TC SSD can be represented as:

$$TC\ SSD=Cs+(Ps*Cs)=Cs*(1+Ps) \qquad \text{EQUATION 5A}$$

Po can denote a percentage of the SSD advertised capacity, Cs, that has been allocated for use by the data storage system. Po*Cs denotes a storage capacity (sometimes referred to as the data storage system's used capacity) that can be used by the LSS of the data storage system to store both valid data and holes where, for example, the holes can include unused storage or invalid user data resulting from overwrites of logical addresses containing user data. In one aspect, Po can be characterized as denoting an upper bound or maximum percentage of the advertised capacity Cs that is allowed to be used by the data storage system for storing data, where such data can include valid data as well as holes of unused or invalid data resulting from overwriting logical addresses of user data. Thus, the holes can occur generally by operation of the LSS in processing, for example, as a result of overwriting existing user data of a logical address with new data, and as a result of performing garbage collection by the data storage system. In existing LSS-based data storage systems, Po can be 100% in that all of the advertised SSD capacity, Cs, can be allocated, used or consumed for storing data by the data storage system. Thus UC SSD, denoting the amount of the SSD storage capacity that the data storage system is allowed to consume or use (e.g., data storage system's used capacity) can be expressed as:

$$UC\ SSD=Cs*Po \qquad \text{EQUATION 5B}$$

UC SSD=Cs*Po can denote the amount of SSD storage capacity used by the LSS of the data storage system, which in at least one existing or traditional LSS-based data storage system can be a constant value of the entire SSD advertised capacity, Cs, where Po is always 100%. Put another way, UC SSD of EQUATION 5B denotes a pool of storage capacity allocated or available for use by the LSS of the data storage system, where the pool can include valid data as well as holes of storage including, for example, unused storage capacity or storage capacity including invalid data. If allowed, the LSS will eventually use all of the storage capacity of the pool, UC SSD, for storing valid data and can include holes of storage capacity resulting from LSS management. Consistent with discussion herein, the holes can generally include storage capacity comprising overhead or extra storage capacity used by the data storage system in connection with management and operation of its LSS.

Based on EQUATION 5A and EQUATION 5B, the utilization of the SSDs, SSDu, as a percentage from the internal perspective of the SSDs (e.g., with respect to TC SSD) can be represented as:

$$SSDu = \frac{UC\ SSD}{TC\ SSD} = \frac{(Cs*Po)}{Cs*(1+Ps)} = \frac{Po}{(1+Ps)} \qquad \text{EQUATION 5C}$$

Based on EQUATION 2D for WA and substituting in the SSDu as expressed in EQUATION 5C as the utilization U in EQUATION 2D, the WAs, denoting the SSD write amplification for the BE PDs can be expressed as:

$$WAs == \frac{1}{1-\frac{C_S*P_O}{C_S*(1+P_S)}} = \frac{1}{1-\frac{P_O}{(1+P_S)}} \qquad \text{EQUATION 5D}$$

The data storage system utilization, DSu, can be represented as:

$$DSu = \frac{Cs*Pm}{Cs*Po} = \frac{Pm}{Po} \qquad \text{EQUATION 6A}$$

Based on EQUATION 2D for WA, and substituting in DSu as expressed in EQUATION 6A as the utilization U in EQUATION 2D, the WAm, denoting the write amplification for the data storage system can be expressed as:

$$WAm = \frac{1}{1-\frac{C_s*P_m}{C_s*P_o}} = \frac{1}{1-\frac{P_m}{P_o}} \qquad \text{EQUATION 6B}$$

Based on EQUATION 2D for WA, and the utilization EQUATIONS 5C and 6A, let WAa (Pm, Po) denote the aggregated WA for the combination of the SSDs and the data storage system which can be expressed as the mathematical product of WAs*WAm and represented as:

$$WAa(Pm, Po) = WAm * WAs \qquad \text{EQUATION 7A}$$

$$= (1/(1-DSu))*(1/(1-SSDu)) \qquad \text{EQUATION 7B}$$

$$= \frac{1}{1-\frac{P_m}{P_o}} * \frac{1}{1-\frac{P_o}{(1+P_s)}} \qquad \text{EQUATION 7C}$$

Based on EQUATION 7A, the aggregated WA, WAa, can be minimized when the write amplification of the data storage system, WAm, and the write amplification of the SSD, WAs, are equal. Generally, the aggregated WAa can be minimized if WAm and WAs are equal, or otherwise maintained to be approximately the same within some specified tolerance or limit.

By taking the partial derivative of EQUATION 7C with respect to Po, setting the differentiated function to 0, and solving for Po, a minimum value for Po can be expressed as a function of utilization, and in particular, Pm. The following EQUATION 8 below is the partial derivative of the EQUATION 7C with respect to Po which is set to 0:

$$\frac{\partial WA_a(P_m, P_o)}{\partial P_o} = \frac{(1+P_s)*P_o^2 - (1+P_s)^2*P_m}{(P_o-P_m)^2*(1+P_s-P_o)^2} = 0 \qquad \text{EQUATION 8}$$

and then solved for Po to determine a minimum for Po expressed as in EQUATION 9 below:

$$Po = \sqrt{(1+P_s)*P_m} \qquad \text{EQUATION 9}$$

As noted above, the aggregated WA, WAa, can be minimized when WAm, the WA of the data storage system, is equal to, or as close as possible to, WAs, the WA of the SSDs. Based on EQUATION 2D, the foregoing two WA values, WAm and WAs, can be equal when the utilization of the SSD is equal to the utilization of the data storage system. In particular, WAm and WAs can be equal when the SSD utilization, SSDu as in EQUATION 5C, is equal to the data storage system utilization, DSu as in EQUATION 6A so that:

$$DSu = SSDu \qquad \text{EQUATION 10A}$$

whereby substituting in values using EQUATION 5C and 6A becomes:

$$Pm/Po = Po/(1+Ps) \qquad \text{EQUATION 10B}$$

In traditional existing systems not using the techniques of the present disclosure, 100% of the SSD advertised capacity, Cs, can be allocated for use by the data storage system all the time. Put another way, existing traditional systems allow the LSS of the data storage system to use or consume 100% of that the SSD storage capacity such that Po can be expressed as a constant or fixed value of 100%. In contrast, in at least one embodiment in accordance with the techniques of the present disclosure, Pm can be used to drive, determine and adjust Po denoting, as a percentage of Cs, the upper bound (UB) or maximum amount of storage capacity allocated for, or used by, the data storage system and its LSS for storing data. Thus, in embodiments using the techniques of the present disclosure, Po can vary and depends upon the needs (e.g., data storage data capacity) of the LSS of the data storage system. In accordance with the techniques of the present disclosure, Po can be used to restrict or limit the SSD capacity used by the data storage system based on the amount of valid data the LSS needs to store. In particular, Po can be determined as expressed using EQUATION 9 where Po varies and depends on Pm, the data storage system utilization with respect to the SSD advertised capacity, Cs. Pm can increase and decrease as the amount of valid data stored by the LSS of the data storage system, respectively, increases and decreases. In an embodiment, Pm*Cs can denote the storage capacity containing valid data, where the LSS-based data storage system is allowed to consume or use an upper bound of storage capacity denoted by Po*Cs, and where Po is determined based on EQUATION 9. Put another way, Po*Cs can denote an amount of storage capacity allocated for use by the LSS-based data storage system to store an amount of valid data denoted by Pm*Cs.

In at least one embodiment, the techniques of the present disclosure provide for increasing Po in accordance with increases in Pm, where Po can be calculated as expressed in EQUATION 9. Additionally, in at least one embodiment, the techniques of the present disclosure can provide for decreasing Po in accordance with decreases in Pm, where Po can be calculated as expressed in EQUATION 9. Thus, Pm can be used to drive and determine Po based on EQUATION 9. Additionally, the desired balance of DSu=SSDu as expressed using EQUATIONs 10A and 10B can be maintained (e.g., within a specified tolerance), which results in WAs=WAm to thereby minimize the aggregated WAa.

In one aspect, the techniques of the present disclosure can control an amount of extra storage capacity of both the data storage system and the SSD by varying Po based on EQUA- TION 9 in accordance with an amount of valid data stored. The extra storage capacity of the SSD can be expressed as (Cs*(1+Ps))−(Po*Cs), where such extra storage capacity of the SSD can be used by its LSS, for example, when performing garbage collection and other operations in connection with writing new data and internal management of the SSD storage. The amount of extra storage capacity of the data storage system can be expressed as (Cs*(Po−Pm)), where such extra storage capacity of the data storage system can be used by its LSS, for example, when performing garbage collection and other operations in connection with writing new data and management of the allocated or used storage capacity (e.g., denoted by Po*Cs). For a given amount of data storage system used capacity, Po*Cs, the amount of valid data can increase and the amount of extra storage capacity can decrease. For example, as hosts or other clients increase the amount of valid data written to and stored on the data storage system, the data storage system can allocate a larger percentage its used storage capacity to store the additional valid data thereby increasing Pm and reducing the remaining extra storage capacity. The techniques of the present disclosure can initially determine a value for Po based on Pm and in accordance with EQUATION 9. The techniques of the present disclosure can further adjust Po based on changes to Pm and in accordance with EQUATION 9. The foregoing provides for the desired balance of DSu=SSDu as expressed using EQUATIONs 10A and 10B, which results in WAs=WAm to thereby minimize the aggregated WAa.

Consistent with other discussion herein in at least one existing traditional system, the WAm and the WAs are considered independently of one another. For example, in at least one existing traditional system, the LSS of the data storage system is allowed to use the entire advertised capacity of the SSDs (e.g., BE PDs). As a result, the utilization by the data storage system of the SSD storage capacity and its associated write amplification, WAm, are minimized. However, in such an existing traditional system, the impact to the WAs of the SSDs is not considered whereby WAa, the aggregated WA of both WAm and WAs, is not considered as a whole and is not evaluated for an optimal minimized WAa.

In at least one embodiment in accordance with the techniques of the present disclosure, both WAm and WAs, and their associated utilizations, DSu and SSDu, can be evaluated and adjusted adaptively and holistically to maintain the relationship therebetween as expressed in EQUATIONS 10A and 10B in order to minimize WAa. As a result, in comparison to existing traditional systems such as noted above, the techniques of the present disclosure provide for improved I/O performance and a reduction in wear leveling of the SSDs by minimizing the WAa. For example, reducing the aggregated WA reduces the background or extra I/Os performed when writing or storing new data, thereby improving the I/O performance of the data storage system. As another example, reducing the aggregated WA and thereby reducing the background or extra I/Os performed when writing new data generally reduces the SSDs' wear level. As a result, the techniques of the present disclosure minimizing the aggregate WA can prolong the lifetime of the SSDs and improve warranty. For storage vendors, the resulting I/O performance improvement, reduction in wear of the SSDs, and extended SSD lifetime can be characterized as tangible benefits desired by data storage system vendors and customers alike.

In at least one embodiment in accordance with the techniques of the present disclosure, one or more conditions (sometimes also referred to as trigger conditions) can be defined which indicate the conditions under which processing can be performed to adjust or modify Po. In at least one embodiment, the conditions can generally specify one or more criteria in accordance with the change in Pm, or the data storage system's data capacity which can be expressed as Pm*Cs. The criteria can include one or more metrics used to express and define the conditions along with associated limits or thresholds. The one or more metrics can generally directly include Pm, Pm*Cs, Po, Po*Cs, or another metric or expression derived from or based on Pm and/or Po. In at least one embodiment, if one of the conditions specified evaluates to true, the data storage system can perform processing to modify or update Po, and thus accordingly modify or update, the data storage system's used capacity in accordance with the change in Pm, or change in the data storage systems data capacity, which can be expressed as Pm*Cs, denoting an amount of valid data stored on the SSDs. In at least one embodiment, the SSDs can be the BE PDs of the data storage system providing the back-end non-volatile data storage for clients of the data storage system. In at least one embodiment consistent with other discussion herein, the data storage system's data capacity, Pm*Cs, can include both host-written or data storage system client-written user data (e.g., data written by applications executing on host(s)) as well as metadata such as the mapping information described in more detail elsewhere herein. From the perspective of the LSS of the data storage system where the data storage system can be characterized as the user storing its data in the LSS, the amount or capacity of valid data denoting by the data storage system's used capacity can include both valid host-written data and also valid metadata such as valid mapping information used by the data storage system.

In at least one embodiment in accordance with the techniques of the present disclosure, processing can be performed at a first point in time to obtain a first value for Pm and also determine a first value for Po using EQUATION 9 with the first value for Pm associated with the first point in time. In at least one embodiment in accordance with the techniques of the present disclosure, one or more trigger conditions can be defined. At a second point in time subsequent to the first point in time, processing can be performed to determine whether one of the defined trigger conditions is met or evaluates to true. The one or more trigger conditions can be determined in accordance with a revised value of Pm at the second point in time. Responsive to determining that one of the defined trigger conditions is met or evaluates to true, the data storage system can determine an updated or revised value for Po using EQUATION 9 and the revised value of Pm associated with the second point in time, and can thus determine an updated or revised value for the data storage system's used capacity which can be expressed as Po*Cs.

The following paragraphs describe trigger conditions that can be defined and used in an embodiment in accordance with the techniques of the present disclosure that can trigger determining an updated or revised value for Po using EQUATION 9, and thus an updated or revised value for the data storage system's used capacity which can be expressed as Po*Cs. Generally, an embodiment can include any one or more of the following conditions.

A first trigger condition can be defined such that, in response to an increase in Pm, or in response to an increase in the data storage system's data capacity storing valid data (e.g., an increase in Pm*Cs), processing can be performed, such as by the data storage system, to determine an updated or revised value for Po using the revised increased value of Pm with EQUATION 9, and thus also determine an updated or revised value for the data storage system's used capacity which can be expressed as Po*Cs.

In connection with the first trigger condition as well as other trigger conditions discussed herein, Pm can increase, for example, if one or more hosts write new data causing an increase in Pm and thus increasing the data storage system's data capacity, Pm*Cs, for storing the newly written host data as additional valid data. In at least one embodiment implementing thin or virtually provisioned LUNs, backend physical storage mapped to a logical address of the thin LUN can be allocated on demand the initial or first time a write is issued to the logical address. Thus, such initial or first writes to particular logical addresses of thin LUNs can result in increasing the amount of valid data stored on the SSDs providing backend storage, thereby increasing Pm and increasing the storage data capacity of valid data denoted by Pm*Cs.

In connection with the first trigger condition as well as other trigger conditions discussed herein, Pm can also decrease, for example, if one or more hosts delete LUNs, file systems, or generally storage objects, where such deletion results in a net decrease in Pm and thus a decrease in the data storage system's data capacity, Pm*Cs, for storing valid data.

In at least one embodiment in connection with the first trigger condition, processing can be performed to determine the amount of change with respect to Pm (e.g., the amount of increase or decrease in either Pm or with respect to the mathematical product of Pm*Cs) at the second point in time. For example, the amount of change in Pm can generally be expressed as the absolute value of the difference between the value of Pm from the first point in time and the revised value of Pm from the second point in time. Po can be determined using EQUATION 9 based on the revised value of Pm. Po can then be accordingly updated, respectively, responsive to the amount of change being above a specified threshold amount of change. Alternatively, the amount of change in the data storage system's data capacity, Pm*Cs, can generally be expressed as the absolute value of the difference between (Cs*Pm from the first point in time) and (Cs*the revised value of Pm from the second point in time). Po can be determined using EQUATION 9 based on the revised value of Pm. Po can then be accordingly updated, respectively, responsive to the amount of change being above a specified threshold amount of change.

A second trigger condition can be defined based on the difference between the current value or setting of Po and a current observed value for Pm, or alternatively the difference between the data storage system's current used capacity (e.g., Po*Cs, where Po is the current value or setting of Po) and the data storage system's current data capacity (e.g., Pm*Cs, the amount of storage capacity of the SSDs currently storing valid data, where Pm is the current observed value for Pm). For the second trigger condition, the foregoing difference can be determined. As a first consideration in connection with the foregoing difference, if the foregoing difference is below a minimum threshold, it can indicate that the system is consuming too much of the data storage system's used capacity for storing valid data and that the LSS of the data storage system does not have a sufficient amount of overhead or extra storage capacity. Generally, the garbage collected efficiency of the LSS of the data storage system can decrease as foregoing difference decreases. As a result, the second trigger condition can specify to increase Po based on EQUATION 9 when the difference falls below a minimum threshold.

In connection with the second trigger condition, if the difference between current values for Po and Pm is below a minimum threshold, a revised or updated value for Po can be calculated using EQUATION 9 for the current observed value of Pm. Po can then be updated to the revised calculated Po, where the data storage system used capacity now increases to Cs* the revised calculated Po.

To further illustrate the second trigger condition, consider the following. At a first point in time, Pm can be 0.05 or 5%, and Po based on EQUATION 9 can be set to a current value of 0.25 or 25%. At a second point in time, it can be determined that Pm has increased to 0.20 or 20%. The difference between the current Po=25% and the current observed value for Pm=20% at the second point in time in this case is 0.05 or 5%. If the difference is below a minimum threshold of difference, processing can be performed to calculate a revised or updated value for Po using EQUATION 9 for the current observed value of Pm=0.20 or 20% at the second point in time. In this case, the revised value for Po=0.51 or 51% as determined using EQUATION 9 for Pm=0.20 or 20%. The current value or setting for Po can be updated to the revised calculated Po=0.51 or 51%, where the data storage system used capacity now increases to Cs* the revised calculated Po (e.g., where the revised Po=0.51 or 51% in this example).

In connection with the second trigger condition as a variation, a condition can be specified that determines whether the difference between current values for Po and Pm is greater than a maximum threshold of difference. If the difference is greater than a maximum threshold of difference, a revised or updated value for Po can be calculated using EQUATION 9 for the current Pm. The current value for Po can then be updated to the revised calculated Po, where the data storage system used capacity now decreases to Cs* the revised value for Po just calculated using EQUATION 9.

To further illustrate the foregoing variation of the second trigger condition consider the following. At a first point in time, Pm can be 0.20 or 20% and Po based on EQUATION 9 can be set to a current value of 0.51 or 51%. At a second point in time, Po can still be set to the current value of 0.51 or 51%. Additionally at the second point in time, it can be determined that Pm has decreased to a current observed value of 0.05 or 5%. The difference between the current Po=51% and the current observed value of Pm=5% at the second point in time can be determined which in this case is 46%. If the difference is above a maximum threshold difference, processing can be performed to calculate a revised or updated value for Po using EQUATION 9 for the current Pm=0.5 or 5% at the second point in time, where the current value for Po can be updated to the revised calculated Po and where the data storage system used capacity now decreases to Cs* the revised calculated Po. In this example, assume the difference of 46% is above the maximum threshold difference, then the current value for Po in effect can be set to the revised value of Po=0.25 or 25%.

A third trigger condition can be defined. In connection with the third trigger condition, an observed current DS utilization, DSu, with respect to the current Po (e.g., data storage system used capacity) can be calculated based on EQUATION 6A using the current observed value for Pm and the current value for Po. A desired or target DSu can also be calculated using EQUATION 6A using the current Pm and a target or desired Po calculated using EQUATION 9 for the current Pm. The difference between the target DSu and the current DSu can be determined. If the absolute value of the difference is greater than a specified threshold, the current Po can be updated or revised and set to the target or desired Po.

To further illustrate the third trigger condition, consider the following. At a first point in time, Pm can be 0.05 or 5% and Po can be set to 0.25 of 25% based on EQUATION 9. At a second point in time, a current observed value for Pm can be 0.20 or 20% while the current Po is still 0.25 or 25%. At the second point in time the current DSu can be calculated as 20/25=80%. At the second point in time, a target or desired DSu can be calculated using the current observed Pm=0.20 or 20% and the target or desired Po=0.51 or 51% (e.g., determined using EQUATION 9 for the current Pm=0.20 or 20% at the second point in time). Also at the second point in time, the target or desired DSu can be calculated as 20/51=39.53%, where the current Pm=0.20 and the target or desired Po=0.51. In this example, the absolute value of the difference between the target or desired DSu and the current DSu can be determined as |39.53%-80%|=40.47%. If 40.47% or 0.4047 is above a specified threshold, the current Po can be updated from 0.25 or 25% to the revised value for Po of 0.51 or 51%.

A fourth trigger condition can be defined. In connection with the fourth trigger condition, if the absolute value of the absolute value of the difference between two DSu values from two points in time is above a specified threshold, processing can be performed to calculate a revised Po using EQUATION 9, where Po can be updated to the revised Po, and where the data storage system used capacity now increases to Cs* the revised Po. For example, at a first point in time, a first DSu can be calculated using EQUATION 6A with a first value or setting for Po at the first point in time and a second value indicating an observed value for Pm from the first point in time. At a subsequent second point in time, the current setting for Po can still be the first value. However, at the second point in time, the observed value for Pm has changed to a third value. At the second point in time, a second DSu can be calculated using EQUATION 6A with the first value for Po and the third value for Pm. The absolute value of the difference between the first DSu and the second DSu can be determined. If the difference is above a specified threshold, processing can be performed to calculate a revised Po using EQUATION 9 for the current observed Pm or third value, where Po can then be updated to the revised Po, and where the data storage system used capacity now increases to Cs* the revised Po.

To further illustrate the fourth trigger condition, consider the following example. Assume that at a first point in time, Pm is 0.05 whereby a value or setting for Po is determined as 0.25 based on EQUATION 9, and where DSu=0.05/0.25=19.76% at the first point in time. At a subsequent second point in time, Pm may have increased to 0.20 but Po can still be set to 0.25. At the second point in time, processing can be performed to determine the current observed DSu at the second point in time using the current value setting for Po=0.25 and the revised value for Pm=0.20 at the second point in time, where DSu=0.20/0.25=0.80 or 80% at the second point in time. The absolute value of the difference between DSu from the first point in time and the current DSu at the second point in time can be determined. In this example, |19.76-80|=60.24%. In this example, if the absolute value of the difference=60.24% is above a specified threshold, then a revised value for Po can be calculated using EQUATION 9 with Pm=0.20 from the second point in time, whereby the revised value of Po=0.51. Accordingly, Po can then be updated to the revised Po=0.51 or 51%, and where the data storage system used capacity now increases to Cs* the revised Po.

In at least one embodiment, a process can execute and assess or evaluate the current state of the data storage system. The process can be a monitoring process that executes, for example, as a background process that runs periodically. The process can evaluate and check for one or more of the foregoing trigger conditions and, responsive to detecting the occurrence of any checked trigger condition, the current Po can be accordingly updated in accordance with EQUATION 9 using a current value for Pm. In at least one embodiment, the foregoing process can executed on the data storage system.

Figure 9:
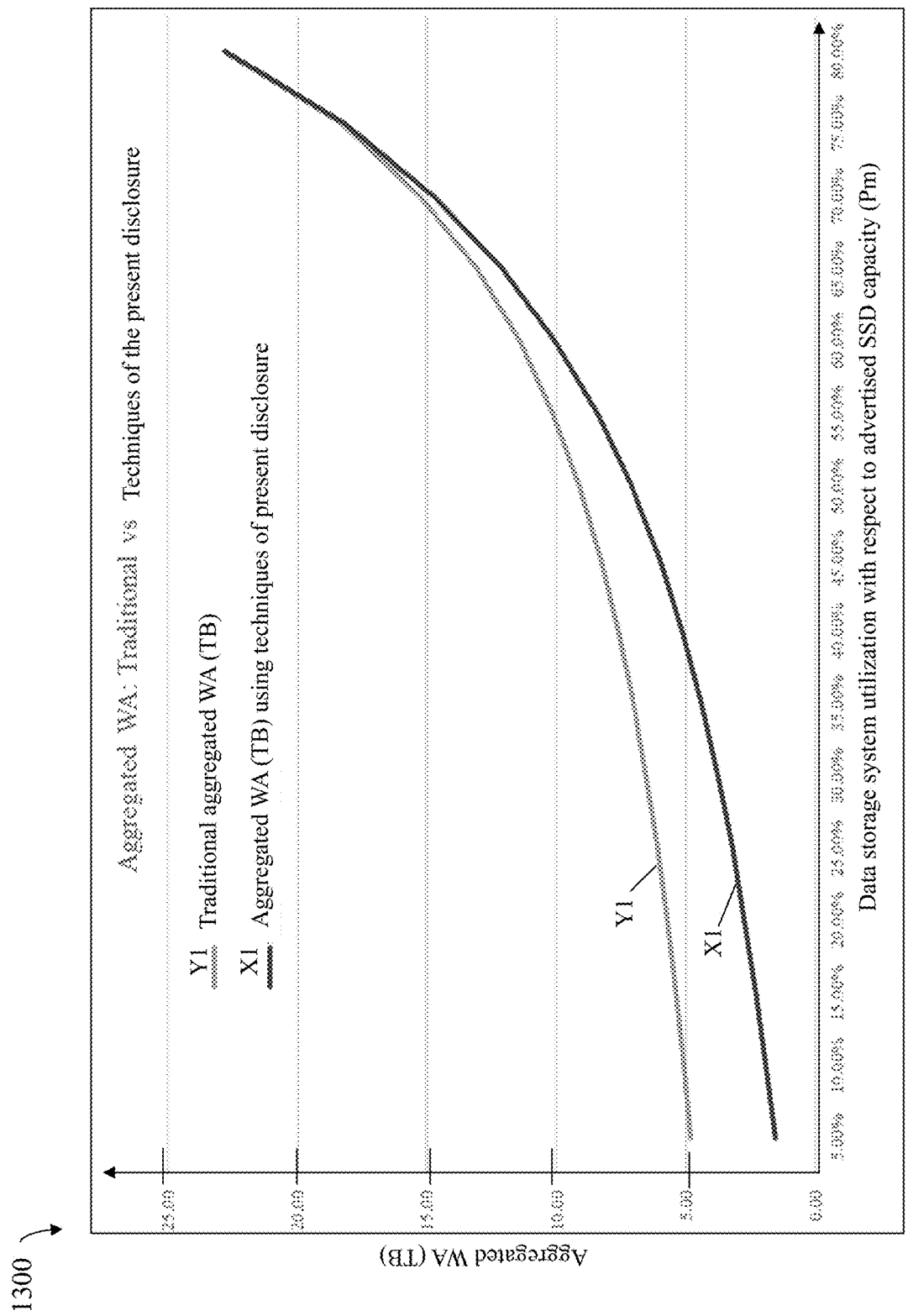
FIG. 9 is a graphical illustration comparing corresponding aggregated write amplification values of the traditional data storage system information of FIG. 8A with those of FIG. 8B of the novel data storage system operating in accordance with the techniques of the present disclosure.

Referring to FIGS. 8A, 8B and 9, shown is an example illustrating use of the techniques of the present disclosure in at least one embodiment. In this embodiment for purposes of illustration, assume the following: Cs=1.0 TB and Ps=28%, where the TC SSD denoting the total raw capacity of the SSDs=1.28 TB.

Referring to FIG. 8A, shown is a table 500 of various parameters based on the foregoing values for Cs and Ps in a traditional existing data storage system not using the techniques herein where Po=100%.

The table 500 includes the following columns: the SSD used capacity 502 (e.g., Cs*Po); the SSD raw capacity 504 (e.g., Cs*(1+Ps)); the SSD utilization SSDu 506; WAs 508; Pm 510; the data storage system (DS) data capacity storing valid data 512 (e.g., Cs*Pm); the DS used capacity 514 (e.g., Cs*Po); DSu 516; WAm 518 and WAa 520 denoting the aggregated WA in the traditional system not using the techniques of the present disclosure.

In such a data storage system illustrated using FIG. 8A, the LSS of the data storage system can be allowed to use 100% of the advertised capacity Cs. Thus based on the illustration of FIG. 8A, the traditional system has a constant fixed value of Po=100% such that the SSD used capacity of column 502 and the DS used capacity of column 514 are equal to Cs. Each row of values in the table 500 provides a single set of parameter values determined using the equations noted above in a traditional existing system with Po=100%, Cs=1 TB and Ps=28% for various values of Pm.

Referring to FIG. 8B, shown is a table 600 of various parameters based on the foregoing values for Cs and Ps in an embodiment of a data storage system using the techniques of the present disclosure.

The table 600 includes the following columns: the SSD used capacity 602 (e.g., Cs*Po); the SSD raw capacity 604 (e.g., Cs*(1+Ps)); the SSD utilization SSDu 606; WAs 608; Pm 610; the data storage system (DS) data capacity storing valid data 612 (e.g., Cs*Pm); the DS used capacity 614 (e.g., Cs*Po); DSu 616; WAm 618 and WAa 620 denoting the aggregated WA in the data storage system in accordance with the techniques of the present disclosure.

In such a data storage system illustrated using FIG. 8B, Po is not a constant fixed value of 100%. Rather in FIG. 8B, values for Po vary in accordance with values for Pm, where the values for Po are determined using EQUATION 9. Thus the values of column 614 denoting the DS used capacity (e.g., Cs*Po) varies with the different values for Po. In this example, it should be noted that since Cs=1 TB, the values in column 614 also denote the percentage Po calculated using EQUATION 9. Each row of values in the table 600 provides a single set of parameter values determined using the equations noted above in a data storage system in accordance with the techniques of the present disclosure with Po determined using EQUATION 9, Cs=1 TB and Ps=28% for various values of Pm.

By comparing the values for WAa of column 520 of FIG. 5 to those of column 620 of FIG. 6, it can be seen that the WAa values of column 620 are smaller than corresponding WAa values of column 520. For example, the element 622a of row 1 of FIG. 6 denoting a WAa=1.55 is less than the WAa=4.81 denoted by the element 522a included in the row 1 of FIG. 5. In a similar manner, the elements 622b-p of FIG. 6 denote WAa values of column 620 that are respectively smaller than corresponding WAa values 522b-p of FIG. 6.

Referring to FIG. 9, shown is a graphical illustration of the aggregated WAa using the techniques of the present disclosure versus a traditional technique where the LSS of the data storage system is allowed to use all the advertised capacity of the SSDs of the BE PDs.

The graph 1300 of FIG. 9 includes the aggregated WA, WAa, on the Y axis and values for Pm (e.g., the data storage system utilization as a percentage of the SSD advertised capacity, Cs). FIG. 9 includes the curve or line Y1 illustrating values for WAa for different corresponding values of Pm in a traditional system where the LSS of the data storage system is always allowed to use all (e.g., P0=100%) the advertised capacity of the SSDs of the BE PDs for storing data. In contrast, FIG. 9 also includes the curve or line X1 illustrating values for WAa for different corresponding values of Pm in a data storage system using the techniques of the present disclosure where the LSS of the data storage system is not always allowed to use all the advertised capacity of the SSDs of the BE PDs for storing data. Rather, consistent with other discussion herein, the techniques of the present disclosure can be used to keep WAs and WAm equal, or approximately equal to each other within some specified tolerance. In at least one embodiment of the techniques of the present disclosure, the data storage system may only increase the amount of SSD advertised capacity it can use as its LSS utilization to store valid data increases. Put another way, as Pm increases where the data storage system's utilization of the BE PDs increases due to storing more valid data, Po can be accordingly increased as a function of, or in accordance with, changes in Pm based on EQUATION 9.

The curve X1 includes WAa values and associated Pm values from the data set of FIG. 8B in accordance with the techniques of the present disclosure. The curve Y1 includes WAa values and associated Pm values from the data set of FIG. 8A of an existing traditional system not using the techniques of the present disclosure.

In accordance with the techniques of the present disclosure and in contrast to existing traditional systems, the LSS of the data storage system is not allowed to always consume for its use all of the SSD advertised capacity Cs, whereby the data storage system's used capacity (e.g., Po*Cs) is not always equal to the entire advertised SSD storage capacity of the BE PDs (e.g., Po is not automatically always 100%). Rather, in accordance with the techniques of the present disclosure, Po denoting the percentage of the SSD advertised capacity consumed or used by the data storage system can vary depending on the Pm in order to benefit the aggregated write amplification WAa by seeking to minimize WAa. Thus, the techniques of the present disclosure can collectively evaluate and adapt the utilizations, DSu and SSDu, and the WAs of both the data storage system and the SSDs used as the BE PDs. In at least one embodiment, the data storage system only increases its Po as its Pm increases such that DSu and SSDu are equal, or about the same within some specified tolerance or limit, and so that WAm and WAs are equal, or about the same within some specified tolerance or limit. As a result, the aggregate WAa can be minimized. Po can be characterized as percentage with respect to the SSD advertised capacity that denotes an upper bound or upper limit regarding the amount of SSD capacity that can be consumed by the data storage system for its LSS at a point in time. The techniques of the present disclosure can thereby limit and restrict the data storage system's used capacity denoting the amount of the SSD capacity used or made available for use by the LSS of the data storage system at various points in time. As the storage system needs additional storage capacity due to an increase in utilization by the LSS (e.g., increase in Pm) to store more valid data, Po can be increased in accordance with EQUATION 9.

Figure 10:
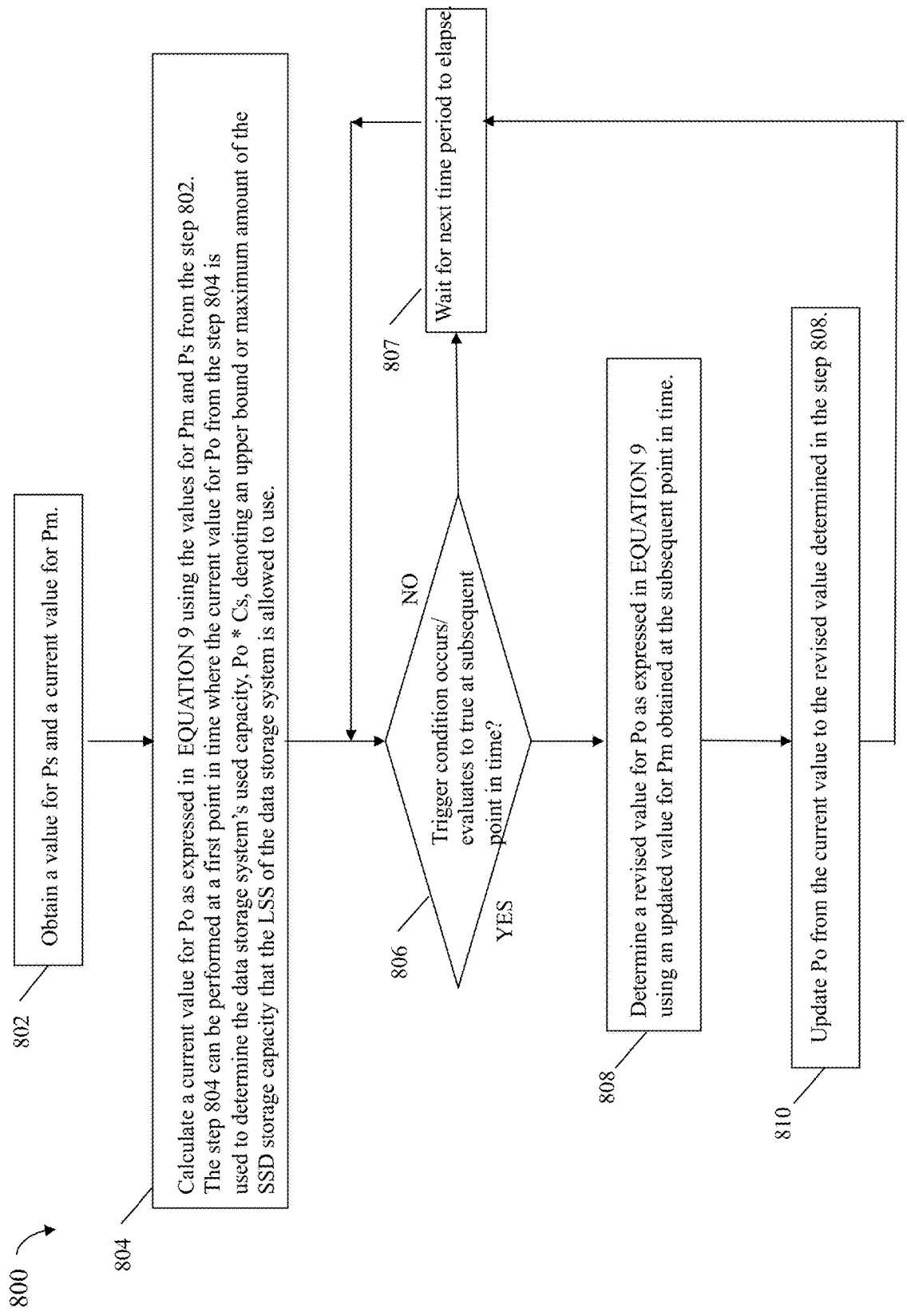
FIG. 10 is a flowchart of processing steps that can be performed in an embodiment in accordance with the techniques of the present disclosure.

Referring to FIG. 10, shown is a flowchart of 800 processing steps that can be performed in at least one embodiment in accordance with the techniques of the present disclosure. The step of the flowchart 800 summarize processing described above.

At the step 802, a value for Ps and a current value for Pm can be obtained. Ps can denote the overprovisioning of the one or more SSDs providing the backend storage for the LSS of the data storage system. Ps can be expressed as percentage with respect to Cs, the SSD advertised capacity. Pm can be a percentage of the SSD advertised capacity, Cs, that contains valid data. From the step 802, control proceeds to the step 804.

At the step 804, processing can be performed to calculate a current value for Po as expressed in EQUATION 9 using the values for Pm and Ps as obtained in the step 802. The step 804 can be performed at a first point in time where the current value for Po from the step 804 is used to determine the data storage system's used capacity, Po*Cs, denoting the upper bound or maximum amount of the SSD storage capacity that the LSS of the data storage system is allowed to consume for storing data. The step 804 can also include subsequently enforcing the current value for Po as the upper bound or maximum amount of the SSD storage capacity that the LSS of the data storage system is allowed to consume for storing data. From the step 804, control proceeds to the step 806.

At the step 806, at a point in time subsequent to first point in time of the step 804, a determination can be made as to whether a trigger condition of the one or more defined trigger conditions occurs. In at least one embodiment, a trigger condition can occur where the specified criteria of the trigger condition is met causing the trigger condition to evaluate to true at the subsequent point in time. If the step 806 evaluates to false or no, control proceeds to the step 807 to wait for the next time period to elapse. In at least one embodiment, the one or more trigger conditions can be periodically evaluated in the step 806 to determine whether any of the trigger conditions evaluates to true. From the step 807, control proceeds to the step 806 to perform a next subsequent evaluation or assessment of the system in accordance with the one or more defined trigger conditions.

If the step 806 evaluates to true or yes, control proceeds to the step 808. At the step 808, processing can be performed to determine a revised value for Po as expressed in EQUATION 9 using an updated value for Pm obtained at the subsequent point in time (e.g., at which the trigger condition occurred causing the step 806 to evaluates to yes). From the step 808, control proceeds to the step 810.

At the step 810, processing can be performed to update a current value of Po to the revised value for Po determined in the step 808. From the step 808, control proceeds to the step 807. As a result of the step 810, the upper bound or maximum amount of the SSD storage capacity that the LSS of the data storage system is allowed to consume for storing data can be updated or revised as the mathematical product, Cs* the revised value for Po determined in the step 808. The foregoing revised upper bound or maximum amount of the SSD storage capacity can be enforced as the current upper bound or maximum amount of the SSD storage capacity that the data storage system is allowed to use.

It should be noted that the flowchart 800 illustrates processing performed to evaluate the one or more defined trigger conditions in a continuous manner as denoted by the flow from the steps 810, 807 and 806. The processing of the flowchart 800 can be performed, for example, by a monitoring process of the data storage system that executes a background process as noted above.

In connection with the flowchart 800, each time the step 806 evaluates to yes where a revised value for Po is determined in the step 808, the data storage system's used capacity, denoted by Cs* the revised value for Po, can be accordingly updated and made effective or enforced by the data storage system in connection with the step 810. Consistent with other discussion herein, the data storage system's used capacity denotes the upper bound or maximum amount of the SSD storage capacity the LSS of the data storage system is allowed to use. Thus updating Po to the revised value, and enforcing Cs* the revised value of Po as the revised data storage system's used capacity, changes or adjusts the upper bound or maximum amount of SSD storage capacity that the data storage system is allowed to consume.

Although not explicitly specified in the processing of FIG. 10, the data storage system can continually receive and process different I/O operations and other commands while performing the processing of FIG. 10. For example, the data storage system can receive and process I/O operations from one or more hosts while performing the processing of FIG. 10. The I/O operations can include read and/or write I/O operations. The write I/O operations can be processed using the LSS of the data storage system, where such write I/O operations are logged by the LSS as described herein. Some of the received write I/O operations can overwrite existing data currently stored at a logical address. Others ones of the received write I/O operations can be characterized as initial or first writes to logical addresses of a thin or virtually provisioned LUN. In at least one embodiment, physical storage for a thin or virtually provisioned LUN can be allocated and mapped to associated logical addresses on demand in response to initially writing to the logical addresses. In this manner the LSS, or more generally the data storage system, can allocate backend physical storage for storing the write data written by the initial writes, where such allocation of the backend physical storage can increase Pm and also the data storage system data capacity (e.g., denoted by Pm*Cs). Additionally the data storage system can receive other types of commands or data operations while performing the processing of FIG. 10, where at least some of the commands or data operations can also affect or change the data storage system's data capacity storing valid data. For example, the other commands or data operations can generally modify or delete storage objects or entities, where such modifications or deletion of storage objects results in changes to Pm and also changes to the data storage system's data capacity (e.g., denoted by Pm*Cs). For example, the other commands can include commands that delete LUNs, files, filesystems or other storage objects resulting in decreasing Pm and decreasing the data storage system's data capacity (e.g., denoted by Pm*Cs). Other commands or data operations can similarly result in increasing Pm and the data storage system's data capacity (e.g., denoted by Pm*Cs). In this manner, the value of Pm can vary at different points in time while performing the processing of FIG. 10 that may result in one or more of the trigger conditions evaluating to true at different points in time.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:

receiving a current value for Ps that denotes an amount of overprovisioning of one or more solid state storage devices (SSDs) as a percentage of Cs that denotes an advertised storage capacity of the one or more SSDs in a data storage system;

receiving a first value for Pm denoting data storage system utilization as a percentage of Cs, wherein the first value for Pm indicates a percentage of the advertised storage capacity, Cs, storing valid data at a first point in time;

determining a second value for Po denoting a percentage of the advertised storage capacity, Cs, allowed to be used by the data storage system, wherein a mathematical product of the second value for Po and Cs denotes an upper bound or maximum storage capacity that the data storage system is allowed to use at the first point in time, wherein said determining the second value for Po includes calculating the second value as a square root of a first quantity, wherein the first quantity is a mathematical product of a first term, 1+Ps, and the first value for Pm;

receiving write I/O operations at the data storage system; and processing the write I/O operations using a log structured system (LSS) of the data storage system, wherein the upper bound or the maximum storage capacity denoted by the mathematical product of the second value for Po and Cs is the maximum amount of storage capacity of the one or more SSDs that the LSS can use while performing said processing of the write I/O operations.

2. The computer-implemented method of claim 1, further comprising:

detecting an occurrence of a trigger condition at a second point in time while the upper bound or the maximum storage capacity denoted by the mathematical product of the second value for Po and Cs is effective as the maximum amount of storage capacity of the one or more SSDs that the LSS can use while performing said processing of the write I/O operations;

receiving a revised value for Pm at the second point in time;

responsive to detecting the occurrence of the trigger condition, performing first processing that determines, for the second point in time, a revised value for Po denoting a percentage of the advertised storage capacity, Cs, allowed to be used by the data storage system, wherein a mathematical product of the revised value for Po and Cs denotes a revised upper bound or a revised maximum storage capacity that the data storage system is allowed to use at the second point in time, wherein determining the revised value for Po includes calculating the revised value for Po as a square root of a second quantity, wherein the second quantity is a mathematical product of the first term, 1+Ps, and the revised value for Pm at the second point in time; and responsive to performing the first processing, enforcing the mathematical product of the revised value for Po and Cs as the revised upper bound or the revised maximum storage capacity that the data storage system is allowed to use wherein the LSS of data storage system is not allowed to use more than the revised upper bound or the revised maximum storage capacity of the one or more SSDs.

3. The computer-implemented method of claim 2, wherein the trigger condition that has occurred indicates that Pm has increased between the first point in time and the second point in time by at least a threshold amount.

4. The computer-implemented method of claim 3, wherein at least a portion of the write I/O operations are initial writes to logical addresses of one or more thin logical devices that implement virtual provisioning where first backend physical storage is allocated from at least a first of the one or more SSDs in connection with servicing the portion of the write I/O operations that perform initial writes to the logical addresses of the one or more thin logical devices, and wherein allocating the first backend physical storage responsive to processing the portion of the write I/O operations result in increasing Pm between the first point in time and the second point in time.

5. The computer-implemented method of claim 2, wherein the trigger condition that has occurred indicates that Pm has decreased by at least a threshold amount.

6. The computer-implemented method of claim 5, wherein Pm has decreased by at least the threshold amount in response to processing one or more operations on the data storage system, wherein the one or more operations include deleting one or more storage objects.

7. The computer-implemented method of claim 6 wherein the one or more storage objects include any one or more of: a logical device, a file, and a file system.

8. The computer-implemented method of claim 2, further comprising:
determining an absolute value of a difference between the revised value for Pm at the second point in time and the second value for Po currently in effect at the second point in time; and
wherein the trigger condition that has occurred indicates that the absolute value of the difference between the second value for Po and the revised value for Pm at the second point in time is greater than a specified threshold.

9. The computer-implemented method of claim 2, further comprising:
determining an absolute value of a difference between the revised value for Pm at the second point in time and the second value for Po currently in effect at the second point in time; and
wherein the trigger condition that has occurred indicates that the absolute value of the difference between the second value for Po and the revised value for Pm at the second point in time is less than a specified threshold.

10. The computer-implemented method of claim 2, further comprising:
determining a first utilization as a ratio of the revised value for Pm at the second point in time with respect to the second value for Po currently in effect at the second point in time;
determining a second utilization as a ratio of the revised value for Pm at the second point in time with respect to the revised value for Po;
determining an absolute value of a difference between first utilization and the second utilization; and
wherein the trigger condition that has occurred indicates that the absolute value of the difference is greater than a specified threshold.

11. The computer-implemented method of claim 2, further comprising:
determining a first utilization as a ratio of the first value for Pm at the first point in time with respect to the second value for Po currently in effect at the second point in time;
determining a second utilization as a ratio of the revised value for Pm at the second point in time with respect to the second value for Po currently in effect at the second point in time;
determining an absolute value of a difference between first utilization and the second utilization; and
wherein the trigger condition that has occurred indicates that the absolute value of the difference is greater than a specified threshold.

12. The computer-implemented method of claim 1, wherein the one or more SSDs are flash-based storage devices.

13. The computer-implemented method of claim 12, wherein the one or more SSDs each implement an LSS in connection with management of storage capacity of said each SSD.

14. A system comprising:
one or more processors; and
a memory comprising code stored thereon that, when executed, performs a method comprising:
receiving a current value for Ps that denotes an amount of overprovisioning of one or more solid state storage devices (SSDs) as a percentage of Cs that denotes an advertised storage capacity of the one or more SSDs in a data storage system;
receiving a first value for Pm denoting data storage system utilization as a percentage of Cs, wherein the first value for Pm indicates a percentage of the advertised storage capacity, Cs, storing valid data at a first point in time;
determining a second value for Po denoting a percentage of the advertised storage capacity, Cs, allowed to be used by the data storage system, wherein a mathematical product of the second value for Po and Cs denotes an upper bound or maximum storage capacity that the data storage system is allowed to use at the first point in time, wherein said determining the second value for Po includes calculating the second value as a square root of a first quantity, wherein the first quantity is a mathematical product of a first term, 1+Ps, and the first value for Pm;
receiving write I/O operations at the data storage system; and
processing the write I/O operations using a log structured system (LSS) of the data storage system, wherein the upper bound or the maximum storage capacity denoted by the mathematical product of the second value for Po and Cs is the maximum amount of storage capacity of the one or more SSDs that the LSS can use while performing said processing of the write I/O operations.

15. The system of claim 14, wherein the method further comprises:
detecting an occurrence of a trigger condition at a second point in time while the upper bound or the maximum storage capacity denoted by the mathematical product of the second value for Po and Cs is effective as the maximum amount of storage capacity of the one or more SSDs that the LSS can use while performing said processing of the write I/O operations;
receiving a revised value for Pm at the second point in time;
responsive to detecting the occurrence of the trigger condition, performing first processing that determines, for the second point in time, a revised value for Po denoting a percentage of the advertised storage capacity, Cs, allowed to be used by the data storage system, wherein a mathematical product of the revised value for Po and Cs denotes a revised upper bound or a revised maximum storage capacity that the data storage system is allowed to use at the second point in time, wherein determining the revised value for Po includes calculating the revised value for Po as a square root of a second quantity, wherein the second quantity is a mathematical product of the first term, 1+Ps, and the revised value for Pm at the second point in time; and
responsive to performing the first processing, enforcing the mathematical product of the revised value for Po and Cs as the revised upper bound or the revised maximum storage capacity that the data storage system is allowed to use wherein the LSS of data storage system is not allowed to use more than the revised upper bound or the revised maximum storage capacity of the one or more SSDs.

16. The system of claim 14, wherein the one or more SSDs are flash-based storage devices.

17. The system of claim 16, wherein the one or more SSDs each implement an LSS in connection with management of storage capacity of said each SSD.

18. A non-transitory computer readable medium comprising code stored thereon that, when executed, performs a method comprising:
receiving a current value for Ps that denotes an amount of overprovisioning of one or more solid state storage devices (SSDs) as a percentage of Cs that denotes an advertised storage capacity of the one or more SSDs in a data storage system;
receiving a first value for Pm denoting data storage system utilization as a percentage of Cs, wherein the first value for Pm indicates a percentage of the advertised storage capacity, Cs, storing valid data at a first point in time;
determining a second value for Po denoting a percentage of the advertised storage capacity, Cs, allowed to be used by the data storage system, wherein a mathematical product of the second value for Po and Cs denotes an upper bound or maximum storage capacity that the data storage system is allowed to use at the first point in time, wherein said determining the second value for Po includes calculating the second value as a square root of a first quantity, wherein the first quantity is a mathematical product of a first term, 1+Ps, and the first value for Pm;
receiving write I/O operations at the data storage system; and
processing the write I/O operations using a log structured system (LSS) of the data storage system, wherein the upper bound or the maximum storage capacity denoted by the mathematical product of the second value for Po and Cs is the maximum amount of storage capacity of the one or more SSDs that the LSS can use while performing said processing of the write I/O operations.

19. The computer readable medium of claim 18, wherein the method further comprises:
detecting an occurrence of a trigger condition at a second point in time while the upper bound or the maximum storage capacity denoted by the mathematical product of the second value for Po and Cs is effective as the maximum amount of storage capacity of the one or more SSDs that the LSS can use while performing said processing of the write I/O operations;
receiving a revised value for Pm at the second point in time;
responsive to detecting the occurrence of the trigger condition, performing first processing that determines, for the second point in time, a revised value for Po denoting a percentage of the advertised storage capacity, Cs, allowed to be used by the data storage system, wherein a mathematical product of the revised value for Po and Cs denotes a revised upper bound or a revised maximum storage capacity that the data storage system is allowed to use at the second point in time, wherein determining the revised value for Po includes calculating the revised value for Po as a square root of a second quantity, wherein the second quantity is a mathematical product of the first term, 1+Ps, and the revised value for Pm at the second point in time; and
responsive to performing the first processing, enforcing the mathematical product of the revised value for Po and Cs as the revised upper bound or the revised maximum storage capacity that the data storage system is allowed to use wherein the LSS of data storage system is not allowed to use more than the revised upper bound or the revised maximum storage capacity of the one or more SSDs.

20. The computer readable medium of claim 18, wherein the one or more SSDs are flash-based storage devices.

* * * * *